United States Patent [19]

Ohyama

[11] Patent Number: 4,799,117
[45] Date of Patent: Jan. 17, 1989

[54] MAGNETIC TAPE CASSETTE LOADING SYSTEM IN RECORDING AND/OR REPRODUCING APPARATUS

[75] Inventor: Masao Ohyama, Tokyo, Japan
[73] Assignee: Sony Corporation, Tokyo, Japan
[21] Appl. No.: 865,282
[22] Filed: May 21, 1986
[30] Foreign Application Priority Data

Jun. 7, 1985 [JP] Japan ................................ 60-123697

[51] Int. Cl.⁴ .......................................... G11B 15/00
[52] U.S. Cl. .................................... 360/96.5; 292/199
[58] Field of Search ............... 360/96.5, 132, 85; 242/197–200

[56] References Cited

U.S. PATENT DOCUMENTS

| 3,980,255 | 9/1976 | Serizawa | 242/198 |
| 4,484,240 | 11/1984 | Yoshida | 360/96.5 |
| 4,673,145 | 6/1987 | Emori | 242/198 |
| 4,683,510 | 7/1987 | Meguro | 360/132 |

FOREIGN PATENT DOCUMENTS

| 0135195 | 5/1985 | European Pat. Off. |
| 0160822 | 11/1985 | European Pat. Off. |
| 2077976 | 12/1981 | United Kingdom |
| 0110586 | 6/1984 | United Kingdom |
| 2149187 | 6/1985 | United Kingdom |
| 2155905 | 10/1985 | United Kingdom |
| 2152009 | 11/1985 | United Kingdom |

*Primary Examiner*—A. J. Heinz
*Attorney, Agent, or Firm*—Ronald P. Kananen

[57] ABSTRACT

A magnetic tape cassette recording and/or reproducing apparatus is provided with a novel loading system which includes a magnetic tape cassette holder movable at least horizontally between an eject position wherein the cassette holder extends from the front face of a housing of the recording and/or reproducing apparatus and a loading position wherein the cassette holder is retracted within the housing and the magnetic tape cassette is in its set position. The cassette holder is cooperative with a cassette actuating means which moves a pivotal front closure lid and a sliding lower cassette face closure member of the magnetic tape cassette between open and closed positions. The cassette actuating means is active during the movement of the cassette holder between the eject position and the loading position to open and close the pivotal closure lid and the sliding closure lid of the magnetic tape cassette.

25 Claims, 15 Drawing Sheets

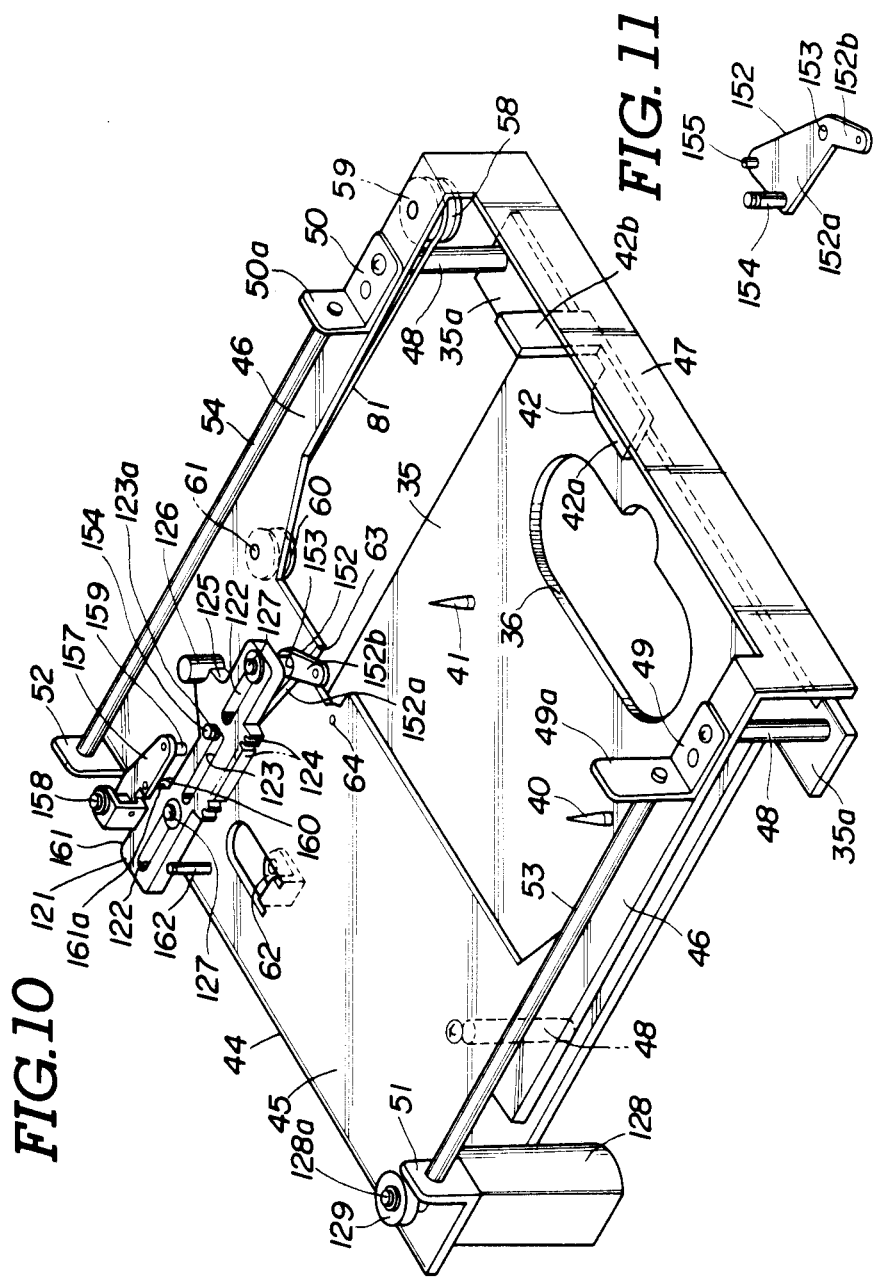

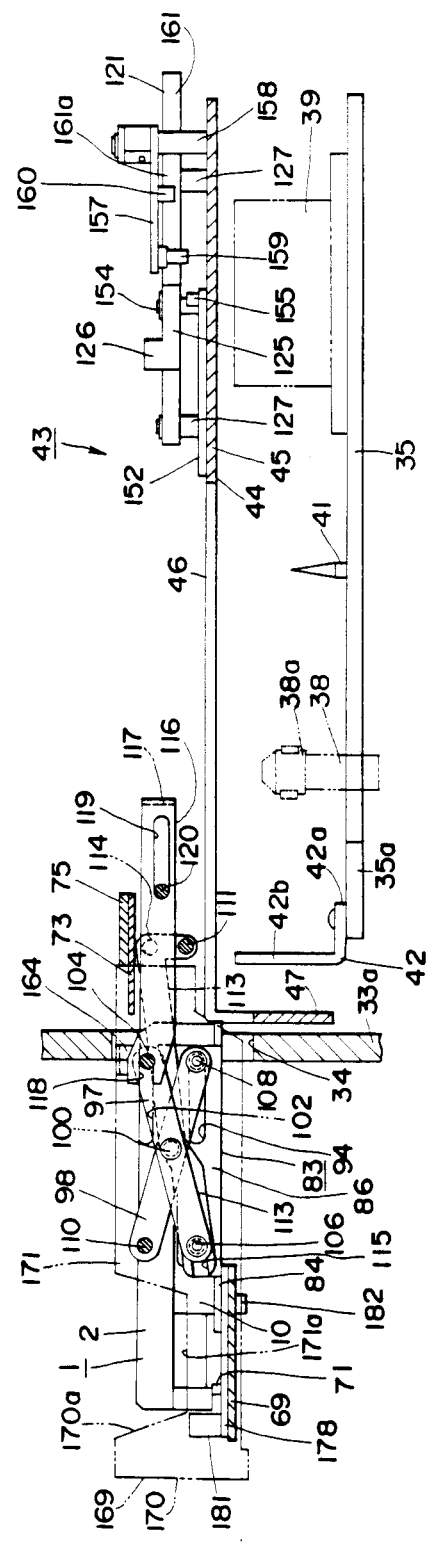

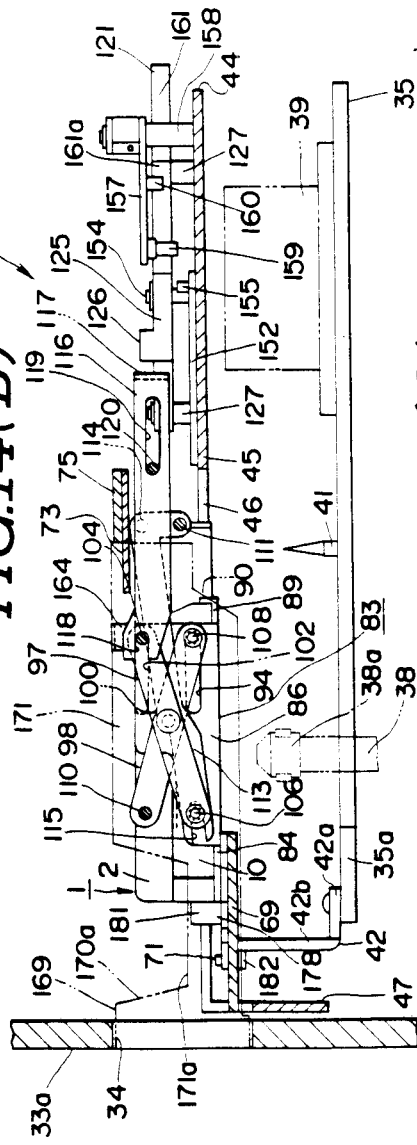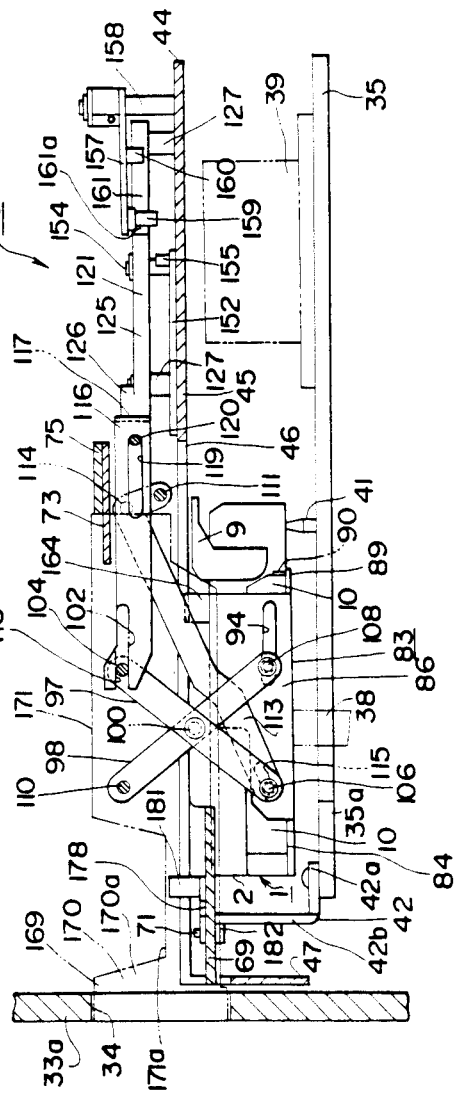

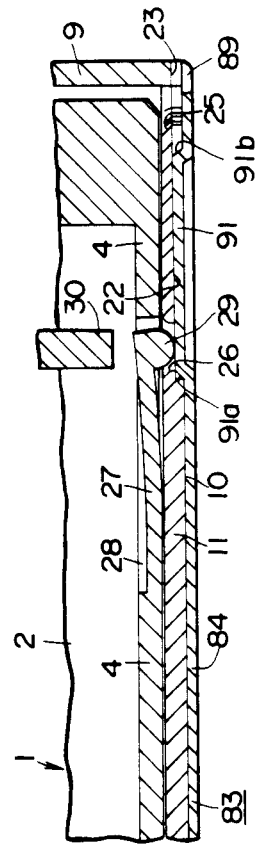
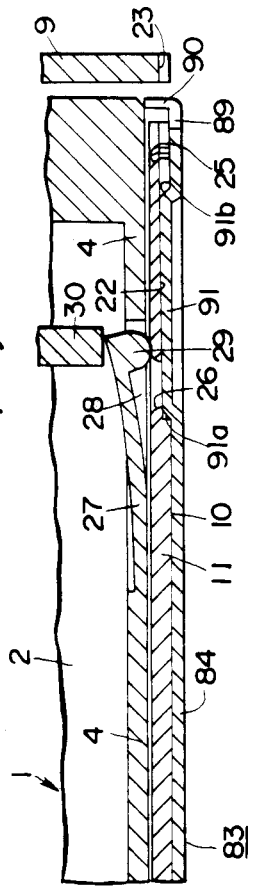
FIG.17(A)
FIG.17(B)

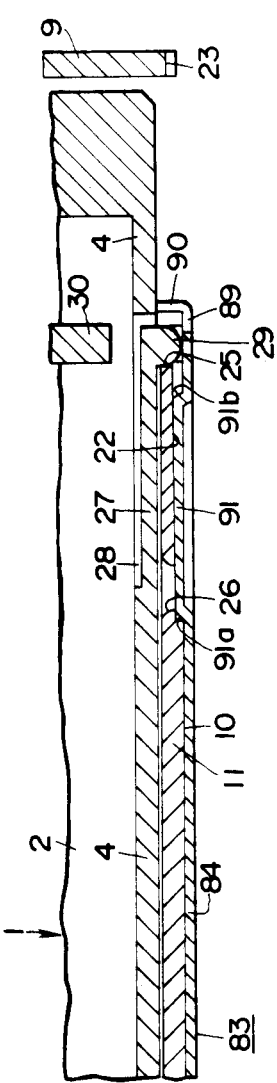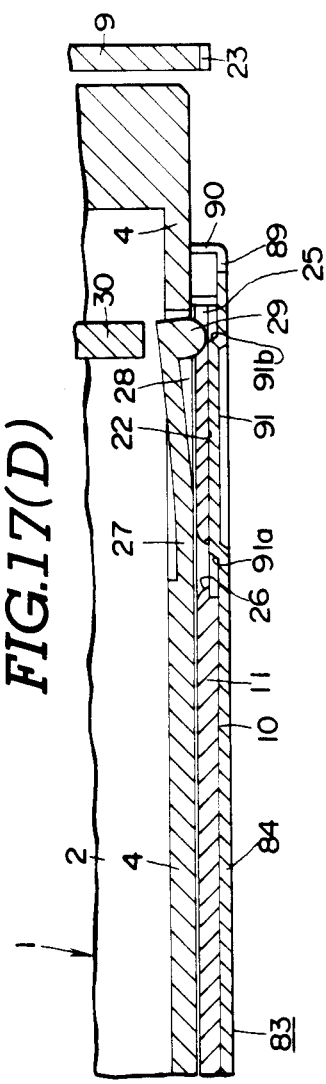

MAGNETIC TAPE CASSETTE LOADING SYSTEM IN RECORDING AND/OR REPRODUCING APPARATUS

BACKGROUND OF THE INVENTION

The present invention relates generally to a loading system for loading a magnetic tape cassette in a recording and/or reproducing apparatus. More specifically, the invention relates to an automatic loading system in a recording and/or reproducing apparatus designed for use with magnetic tape cassettes having a front pivotal closure lid for openably closing the front opening of the magnetic tape cassette, and a sliding closure member covering a lower cut-out in the cassette housing. Still more specifically, the invention relates to a magnetic tape cassette recording and/or reproducing apparatus including a front-loading magnetic tape loading system, specifically designed for recording and/or reproducing magnetic tape cassettes of the type which have a front pivotal closure lid for openably closing the front opening of the magnetic tape cassette, and a sliding closure member covering a lower cut-out in the cassette housing, such as a peripheral-scan pulse-code modulated (PCM) audio cassette.

In recent years, various recording and reproducing apparatus have been developed to convert analog signals, such as audio signals and the like, into digital signals, e.g. PCM signals, which are then recorded on and reproduced from magnetic tape serving as a recording medium. Some of these apparatus employ rotary heads in order to achieve a relatively high recording density. Recording and reproducing apparatus specifically designed to record and reproduce PCM signals and employing a rotary head will be referred to as a "PCM recorder" throughout the disclosure. A PCM recorder, at first, pulls a loop of magnetic tape out through a front opening of the cassette and winds the tape around a rotary drum accommodating the rotary head and then recording and reproduction is performed. In such digital recording and reproducing systems, oily deposits, such as fingerprints or the like, and/or dust adhering to the tape surface may cause dropout of reproduced signals.

Various approaches have been tried to protect the magnetic recording medium. For example, a closure lid may be used to retractably cover the front end opening of the cassette, through which the tape is extracted for access by a rotary head. This closure lid is held closed while the tape is not in use and is moved to an open position when the cassette is inserted into the PCM recorder. In this earlier approach, a drawback may be encountered when the closure lid is unintentionally or accidentally opened, exposing the tape to oily fingerprints, dust and so forth while it is not in use. A locking mechanism which can conveniently lock the closure lid in its open and closed positions could resolve this problem.

Such a magnetic tape cassette which has a tape-protective pivotal lid has been disclosed in the U.S. Pat. No. 3,980,255, issued on Sept. 14, 1976, to Akio SERIZAWA and assigned to the common assignee to the present invention. In the disclosure, the magnetic tape cassette for a magnetic recording and/or reproducing apparatus has a housing with an opening through which the tape can be withdrawn from the cassette housing for the recording and reproduction of signals thereon, as by one or more rotary heads, and a lid is provided to normally close the housing opening when the cassette is not in use and thereby protect the tape from damage. The lid is associated with a latch mechanism for locking the lid in its closed position, and this latch mechanism can be released by inserting the cassette into a cassette holder. Recently developed magnetic tape cassettes additionally include sliding closures or shutters which cover a lower opening which allows entry of loading devices and tape reel drives of the recording the reproducing apparatus. These sliding closures can also move between open and closed positions. The sliding shutters are associated with lock mechanism which lock them in both their open and closed positions.

For loading such magnetic tape cassettes having a pivotal closure lid and a sliding closure member for recording and/or reproduction, it has become necessary to actuate the pivotal lid and the sliding closure member so that they may be moved to the open position when loaded into a recording and/or reproducing apparatus and to the closed position when ejected from the recording and reproducing apparatus.

SUMMARY OF THE INVENTION

Therefore, it is a principle object of the present invention to provide a magnetic tape cassette recording and/or reproducing apparatus having a loading system which can automatically actuate a pivotal closure lid and a sliding closure member of a magnetic tape cassette.

Another object of the invention is to provide a magnetic tape cassette recording and/or reproducing apparatus including a front-loading loading system which can actuate a pivotal closure lid and a sliding closure member between open and closed positions depending upon the position of a magnetic tape cassette within the apparatus.

A further object of the invention is to provide a peripheral-scan recording and/or reproducing apparatus, such as a PCM recording and/or reproducing apparatus including a magnetic tape cassette loading system which allows loading of magnetic tapes having a pivotal closure lid and a sliding closure member by simply putting the cassette on a cassette holder of the recording and/or reproducing apparatus.

In order to accomplish the aforementioned and other objects, a magnetic tape cassette recording and/or reproducing apparatus, according to the present invention, is provided with a novel loading system which includes a magnetic tape cassette holder movable at least horizontally between an eject position wherein the cassette holder extends from the front face of a housing of the recording and/or reproducing apparatus and a loading position wherein the cassette holder is retracted within the housing and the magnetic tape cassette is in its set position. The cassette holder is cooperative with a cassette actuating means which moves a pivotal front closure lid and a sliding lower cassette face closure member of the magnetic tape cassette between open and closed positions. The cassette actuating means is active during the movement of the cassette holder between the eject position and the loading position to open and close the pivotal closure lid and the sliding closure lid of the magnetic tape cassette.

According to one aspect of the invention, a cassette loading system for a recording and/or reproducing apparatus for a magnetic tape cassette which has at least a sliding closure member openably closing a cut-out in the bottom of the cassette casing, which cassette loading system comprises cassette holding means for receiving and holding the magnetic tape cassette within a cassette receptacle defined therein, the cassette holding means being movable between an eject position, in which it can receive a cassette and allow a cassette to be removed, and a loading position at which cassette loading is completed, and first means, associated with the cassette holding means, for actuating the sliding closure member from its closed position to its open position in synchronism with movement of the cassette holding means from the eject position to the loading position.

Preferably, the first means comprises a first pusher means for shifting the magnetic tape cassette in the cassette receptacle from a first position, at which the magnetic tape cassette can be removed from the cassette receptacle, to a second position, at which the magnetic tape cassette is held within the cassette receptacle, the pusher means being associated with the cassette holding means for synchronous operation therewith and actuating the sliding closure member from the closed position to the open position during shifting of the magnetic tape cassette from the first position to the second position.

In the further preferred embodiment, the recording and/or reproducing apparatus is adapted to perform a recording and/or reproducing operation for the magnetic tape cassette which includes first locking means for locking the sliding closure member in the closed position, and the first means also comprises a first unlocking means active during operation of the pusher means for unlocking the first locking means of the magnetic tape cassette, thereby enabling the sliding closure member to be actuated from the closed position to the open position.

The cassette holding means comprises an elastic means for elastically holding the magnetic tape cassette in the second position.

In the alternative, the cassette loading system in the preferred construction also comprises second means, associated with the cassette holding means, for actuating the sliding closure member from the open position to the closed position in synchronism with movement of the cassette holding means from the loading position to the eject position. The second means comprises a second pusher means for shifting the magnetic tape cassette in the cassette receptacle from the second position to the first position, the second pusher means being associated with the cassette holding means for synchronous operation therewith and actuating the sliding closure member from the open position to the closed position during shifting of the magnetic tape cassette from the second position to the first position. The magnetic tape cassette also includes second locking means for locking the sliding closure member in the open position, and the second means also comprises a second unlocking means active during operation of the second pusher means for unlocking the second locking means of the magnetic tape cassette, thereby enabling the sliding closure member to be actuated from the open position to the closed position.

The cassette holding means may comprise a horizontally movable component and a vertically movable component, the vertically movable component holding the magnetic tape cassette, the horizontally movable component being movable between the eject position and an intermediate position located at the intersection between the horizontal movement of the horizontally movable component and the vertical movement of the vertically movable component, the vertically movable component being movable between the intermediate position and the loading position and cooperative with the horizontally movable component for horizontal movement therewith. A cassette loading system also comprises first locking means for locking the vertically movable component at the intermediate position for restricting vertical movement thereof during horizontal movement with the horizontally movable component, and a second locking means for locking the horizontally movable component at the intermediate position for restricting horizontal movement thereof, during vertical movement of the vertically movable component.

the cassette loading system further comprises a pair of arms, one end of which is associated with the vertically movable member and the other end of which is associated with the horizontally movable component, the arms being connected by means of a pivot for pivotal movement between a first position in which the vertically movable component is vertically offset from the horizontally movable component, and a second position in which the vertically movable component is in an intermediate position. The arms are associated with the first locking means to be locked in the second position.

According to another aspect of the invention, a cassette loading system for a recording and/or reproducing apparatus for a magnetic tape cassette which has a sliding closure member openably closing a cut-out in the bottom of the cassette casing, the cassette loading system comprises cassette holding means for receiving and holding the magnetic tape cassette within a cassette receptacle defined therein, the cassette holding means being movable among a first position in which the cassette receptacle is exposed for insertion and removal of the magnetic tape cassette, a second position horizontally offset from the first position, and a third position vertically offset from the second position and at which cassette loading is completed; first means, associated with the cassette holding means, for driving the latter between the first and second positions; second means, associated with the cassette holding means, for driving the latter between the second and third positions; and timing control means, associated with the first and second means, for selectively enabling and disabling operation of the first and second means during movement of the cassette holding means, the timing control means disabling one of the first and second means while the other of the first and second means is in operation.

Preferably, the cassette holding means comprises a horizontally movable component and a vertically movable component, the vertically movable component holding the magnetic tape cassette and cooperating with the horizontally movable component at the second position for horizontally moving together with the horizontally movable component. The horizontally movable component is associated with the first means to be driven horizontally between the first and second positions while carrying the vertically movable component, and the vertically movable component is associated with the second means to be driven vertically between the second and third positions independently of the horizontally movable component while the horizontally movable component is held in the second position.

The cassette loading system also comprises a first locking means for locking the horizontally movable component in the first position, a second locking means for locking the horizontally movable component in the second position, a third locking means for locking the vertically movable member in the second position and a fourth locking means for locking the vertically movable component in the third position.

The second and third locking means cooperate with each other at the second position so that the second locking means locks the horizontally movable component in the second position while the third locking means is deactivated to allow vertical movement of the vertically movable component, and the third locking means locks the vertically movable component in the second position while the second locking means is deactivated to allow horizontal movement of the horizontally movable component with the vertically movable component.

Preferably, the cassette loading system further comprises third means, associated with the cassette holding means, for actuating the sliding closure member between the closed position and the open position during movement of the cassette holding means between the first and second positions. The movement of the cassette holding means includes a horizontal component and a vertical component, the horizontal and vertical components intersecting at a third position, and the third means is active during horizontal movement of the cassette holding means between the first and third positions. The third means is adapted to drive the magnetic tape cassette between a set position at which the magnetic tape cassette is held within the cassette holding means, and a released position wherein the magnetic tape cassette rests freely within the cassette holding means, the third means actuating the sliding closure lid between the closed position and the open position during movement of the magnetic tape cassette between the set position and the released position.

The cassette loading system is prefereably adapted to perform a recording and reproducing operation for the magnetic tape cassette which includes a locking means for locking the sliding closure member in the closed positions, and the third means unlocks the locking means of the magnetic tape cassette while actuating the sliding closure member from the closed position to the open position.

In the preferred construction, the first and second means are driven by a common driving means. The driving means includes a driving motor and power train, the power train including means for selectively transmitting driving force to one of the first and second means. The driving force transmitting means comprises a first gear associated with the first means, a second gear is associated with the second means, and a third gear associated with the driving motor to be driven by the latter and selectively transmit the driving force of the driving motor to one of the first and second gears. The third gear transmits the driving force to the first gear while the vertically movable component is locked at the second position, and to the second gear while the horizontally movable component is locked at the second position.

According to a further aspect of the invention, a cassette loading system for a recording and/or reproducing apparatus for a magnetic tape cassette which has a sliding closure member openably closing a cut-out in the bottom of the cassette casing, the cassette loading system comprises cassette holding means for receiving and holding the magnetic tape cassette within a cassette receptacle defined therein, the cassette holding means being movable among a first position in which the cassette receptacle is exposed to facilitate insertion and removal of the magnetic tape cassette, a second position horizontally offset from the first position, and a third position vertically offset from the second position and at which cassette loading is completed; first means, associated with the cassette holding means, for driving the latter between the first and second positions; second means, associated with the cassette holding means, for driving the latter between the second position and third position; third means, associated with the first means, for selectively actuating the sliding closure member between closed positions and open positions depending upon the cassette holder position between the first and second positions; and timing control means, associated with the first and second means, for selectively enabling and disabling operation of the first and second means during movement of the cassette holding means, the timing control means disabling one of the first and second means while the other of the first and second means is in operation.

The cassette holding means is movable in a first horizontal direction and in a second vertical direction, and prevented from moving in the second direction during movement in the first direction and from moving in the first direction during movement in the second direction.

The third means is active for actuating the sliding closure member between the closed position and the open position during the movement of the cassette holding means in a horizontal direction.

According to a still further aspect of the invention, a combination of a magnetic tape cassette and a cassette loading system in a recording and/or reproducing apparatus for the magnetic tape cassette wherein:

The magnetic tape cassette includes:
  a cassette casing housing a magnetic tape and having a front opening exposing the magnetic tape therethrough, and a cut-out in its floor for receiving a tape loading mechanism of a recording and/or reproducing apparatus therethrough;
  a pivotal closure lid for openably closing the front opening of the magnetic tape cassette;
  a sliding closure member movable between a closed position closing the cut-out and an open position opening the cut-out; and
  locking means, associated with the sliding closure member, for locking the latter in the closed position and in the open position; and the loading system comprises:
  cassette holding means for receiving and holding the magnetic tape cassette within a cassette receptacle defined therein, the cassette holding means being movable among a first position in which the cassette receptacle is exposed to facilitate insertion and removal of the magnetic tape cassette, a second position horizontally offset from the first position, and a third position vertically offset from the second position and at which cassette loading is completed;
  first means, associated with the cassette holding means, for driving the latter between the first and second positions;
  second means, associated with the cassette holding means, for driving the latter between the second position and third position; and
  third means, associated with the first means, for selectively actuating the pivotal closure lid and the sliding closure member between closed positions and open positions depending upon cassette holder position between the first and second positions.

According to a yet further aspect of the invention, a combination of a magnetic tape cassette and a cassette loading system in a recording and/or reproducing apparatus for the magnetic tape cassette wherein:

the magnetic tape cassette includes:
  a cassette casing housing a magnetic tape and having a front opening exposing the magnetic tape therethrough, and a cut-out in its floor for receiving a tape loading mechanism of a recording and/or reproducing apparatus therethrough;
  a pivotal closure lid for openably closing the front opening of the magnetic tape cassette;
  a sliding closure member movable between a closed position closing the cut-out and an open position opening the cut-out; and
  locking means, associated with the sliding closure member, for locking the latter in the closed position and in the open position; and
the loading system comprises:
  cassette holding means for receiving and holding the magnetic tape cassette within a cassette receptacle defined therein, the cassette holding means being movable among a first position in which the cassette receptacle is exposed to facilitate insertion and removal of the magnetic tape cassette, a second position horizontally offset from the first position, and a third position vertically offset from the second position and at which cassette loading is completed;
  first means, associated with the cassette holding means, for driving the latter between the first and second positions;
  second means, associated with the cassette holding means, for driving the latter between the second position and the third position;
  third means, associated with the first means, for selectively actuating the pivotal closure lid and the sliding closure member between closed positions and open positions depending upon cassette holder position between the first and second positions; and
  a timing control means for selectively enabling and disabling operation of the first and second means during movement of the cassette holding means, the timing control means disabling one of the first and second means while the other of the first and second means is in operation.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings:

FIG. 10 is a perspective view of a mechanical chassis of the preferred embodiment of the recording and/or reproducing apparatus;

FIG. 11 is a perspective view of a lock lever of the recording and/or reproducing apparatus of FIG. 10;

FIGS. 14(A) to 14(C) are sections similar to FIG. 13, but showing various positions of the cassette holder during cassette loading or ejection;

FIGS. 17(A) through 17(D) are enlarged sections through the major part of the magnetic tape cassette of FIG. 1, showing the locking and unlocking operations of the sliding closure member.

DESCRIPTION OF THE PREFERRED EMBODIMENT

Figure 1:
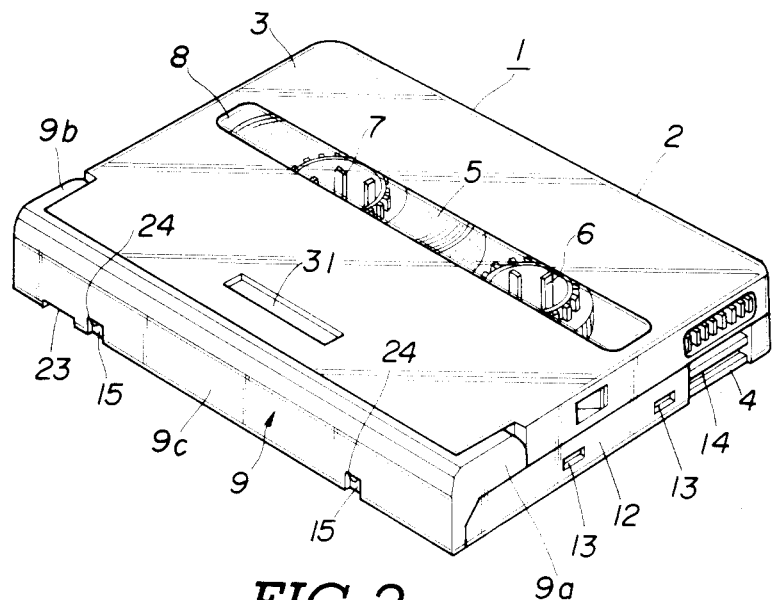
FIG. 1 is a perspective view of the preferred embodiment of a magnetic tape cassette in accordance with the present invention, in which a pivotal closure lid and a sliding closure member are in their respective closed positions.

A magnetic tape cassette recording and/or reproducing apparatus according to the present invention will be described herebelow in terms of the preferred embodiments in order to facilitate a better understanding of the present invention. The preferred embodiments of the magnetic tape cassette recording and reproducing apparatus which will be described in detail hereafter are designed to record and reproduce a novel, recently proposed magnetic tape cassette specifically designed for PCM audio recording and/or reproduction. However, the present invention will be applicable not only for that specific PCM audio recording magnetic tape cassette but also any magnetic tape cassettes which have the same or similar cassette structures.

Because of the rather complicated structures of the preferred embodiments of the recording and/or reproducing apparatus, the following disclosure will be in terms of separate groups of components. Throughout the disclosure, the word "front" used with respect to the magnetic tape cassette means the side of the cassette having an exposed magnetic tape path outside of the cassette casing and accessible to the magnetic heads of the recording and reproducing apparatus, and the word "rear" used with respect to the magnetic tape cassette means the side opposite from the "front side". On the other hand, the word "front" as used with respect to the recording and/or reproducing apparatus means the side of the recording and/or reproducing apparatus toward which a cassette holder in a magnetic tape cassette loading system moves when the magnetic tape cassette is being ejected, and the word "rear" as used with respect to the recording and/or reproducing apparatus means the side opposite from the "front side".

Magnetic Tape Cassette

FIGS. 1 to 4 show a PCM audio magnetic tape cassette for which the preferred embodiment of the recording and/or reproducing apparatus is specifically adapted to perform a recording and/or reproducing operation.

Referring to FIGS. 1 to 4, a magnetic tape cassette 1 generally comprises a casing 2 including an upper section 3 and a lower section 4 which are connected by threaded bolts (not shown) in a per se well-known manner to form a single unit. A transparent window plate 8 is built into the upper surface of the upper section 3. A pair of reel hubs 6 and 7 incorporated into the cassette casing 2 rotatably engage a pair of reel shaft insertion apertures 21. The apertures 21 are forme din the lower section 4 at predetermined positions which establish a suitable spacing between the reel hubs 6 and 7. A magnetic tape 5 is wound around the reel hubs 6 and 7.

Figure 3:
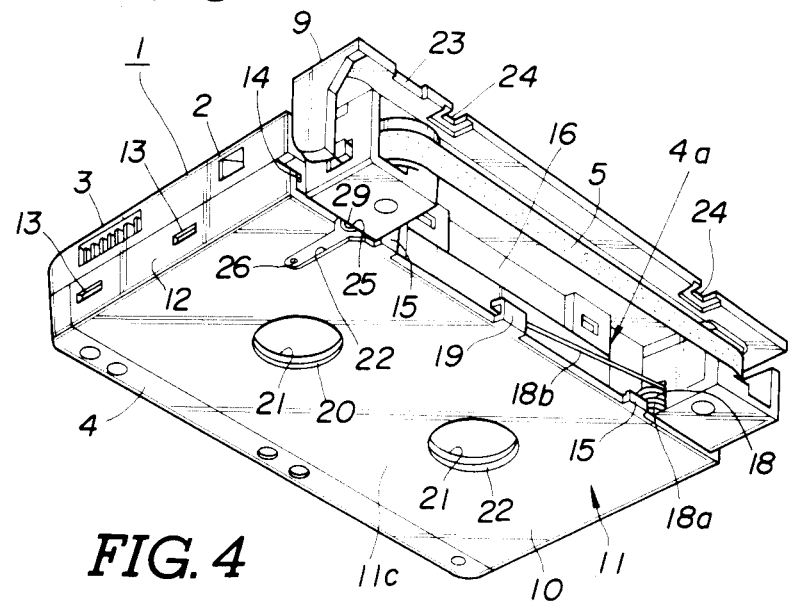
FIG. 3 is a perspective view of the magnetic tape cassette of FIG. 1, viewed from below the cassette, in which the pivotal closure lid and the sliding closure member are in their respective open positions during use of the cassette.
Figure 4:
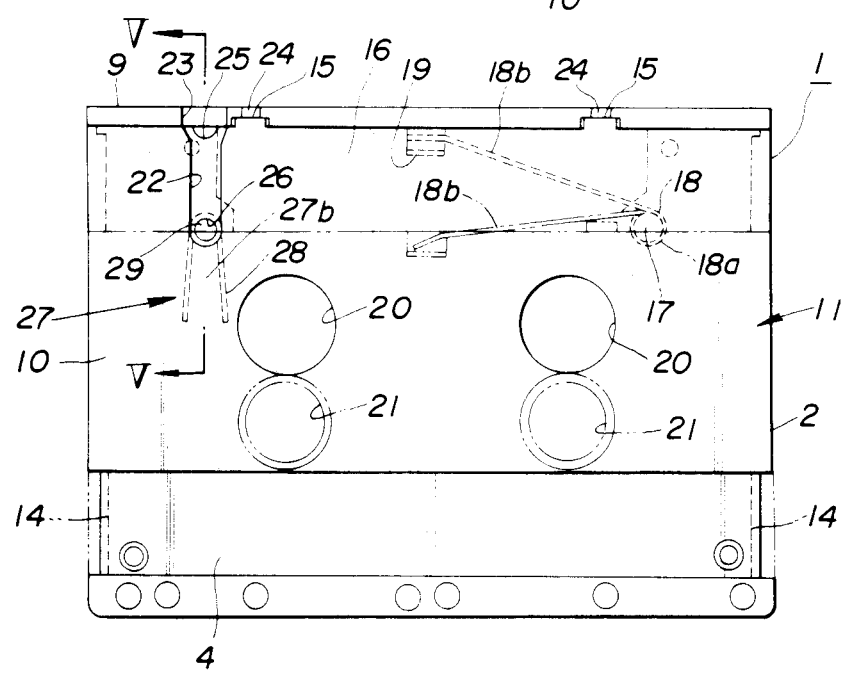
FIG. 4 is a bottom view of the magnetic tape cassette with its sliding closure member in its closed position.

A pivotal closure lid 9 is rotatably or pivotally attached to the right and left side walls of the cassette casing near the front end of the tape cassette 1. When the pivotal closure lid 9 is pivoted away from the front surface of the tape cassette, the magnetic tape 5 is exposed, as shown in FIG. 3. An essentially rectangular cut-out 4a is formed in the front end of the lower section 4. When the magnetic tape cassette 1 is inserted into a PCM recorder which will be briefly discussed later, a tape guide system or a device constituting part of a tape retaining mechanism (not shown) is inserted into the cut-out portion 4a and pulls out some of the tape 5 for loading onto a rotary head of the PCM recorder. A sliding closure member 11 engages the lower section 4 and covers and exposes the cut-out portion 4a as it slides back and forth.

Figure 2:
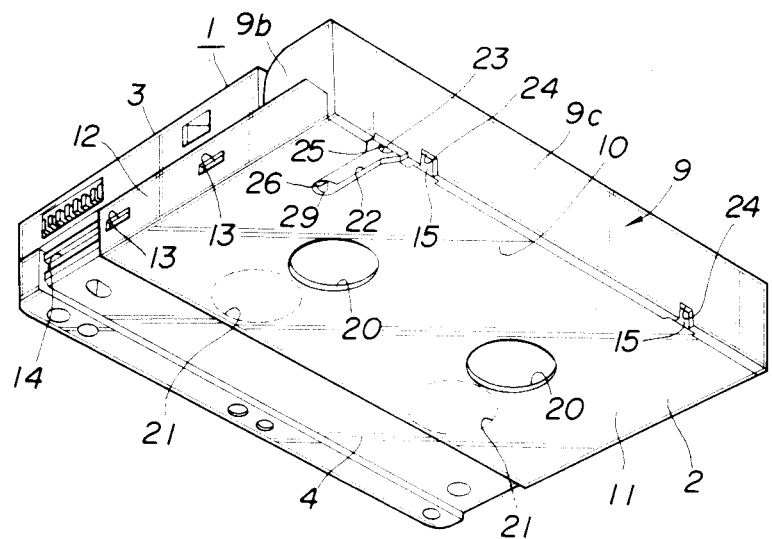
FIG. 2 is a perspective view of the magnetic tape cassette of FIG. 1, viewed from below the cassette, in which the pivotal closure lid and the sliding closure member are in their respective closed positions, corresponding to the position illustrated in FIG. 1.

While the tape cassette 1 is not in use, the pivotal closure lid 9 is located opposite a front opening formed in the front surface of the casing 2 to cover the latter. At the same time, the sliding closure 11 is in its forwardly-shifted position in which it covers the cut-out portion 4a of the lower section 4 and thus prevents the tape guide system from reaching into the tape cassette 1 for the tape, as shown in FIG. 2. The closure lid 9 can pivot away from the front surface of the cassette 1 to expose the magnetic tape 5, and the sliding closure member 11 can move to the rear to expose the cut-out portion 4a so that the tape guide system can reach into the cut-out portion 4a to draw some of the magnetic tape 5 out of the cassette casing for loading onto a rotary drum for recording or playback. Thereafter, when the recording or playback is over and the tape cassette 1 is returned to the stand-by state, the pivotal closure lid and the sliding closure member are returned to the aforementioned closed positions. Throughout the rest of this document, the positions of the pivotal closure lid 9 and the sliding closure 11 in which they cover the front opening and the cut-out portion 4a respectively will be referred to as a "closed position" and the position of the lid 9 and the sliding closure 11 in which they expose the front opening and the cut-out portion 4a will be referred to as an "open position".

The cassette casing 2 also has a pair of integrally formed tape guide columns at the left- and right-hand ends of the front edge of the lower section 4, as shown in FIG. 3. The magnetic tape 5 is stretched between and around the tape guide columns so as to follow a predetermined tape run or path along the front edge of the tape cassette 1 and across the front opening over the rotary head.

The cut-out portion 4a of the lower section 4 extends over a predetermined width so as to expose the rear surface of the magnetic tape 5 stretched between the tape guide columns. During recording or reproduction, a device constituting part of the tape actuating system or tape guide system projects into the cut-out portion 4a and draws out a section of the magnetic tape 5. The tape actuating system is part of the PCM recorder.

The pivotal closure lid 9 is elongated along the major dimension of the front opening and has arms 9a and 9b projecting from its opposite ends which pivotably attach the lid 9 to the front of the cassette casing 2 by means of pivot shafts (not shown). Thus, the pivotal closure lid 9 can be pivoted to selectively cover and expose the front opening of the cassette casing 1. The closure lid 9 also comprises a plate 9c which is elongated in the direction of the opening in the cassette casing 2 and covers the entire length of the front of the cassette casing 1. When the closure lid 9 is rotated to the closed position to cover the front of the cassette casing 1, the arms 9a and 9b lie flush with the contours of the upper section 3 as best shown in FIGS. 1 and 2. When the closure lid 9 is in this position, the sliding closure 11 is held in its forward position under the arms 9a and 9b as shown in FIGS. 2 and 3 by means described later. The rotary shafts about which the lid 9 pivots are approximately centered on the inner surfaces of the respective arms 9a and 9b. Cut-away portions 24 are formed by cutting small grooves into the lower edge of the plate 9c toward the left and right extremes of the cut-out portion 4a of the lower section 4.

The sliding closure member 11 has a flattened U-shaped configuration and is so mounted on the lower section 4 of the cassette casing 2 that it can slide back and forth parallel to the lower surface of the lower cassette section 4. Apertures 20 respectively corresponding to the reel shaft insertion apertures 21 are formed in the sliding closure member 11 in such positions that after the sliding closure member 11 slides all the way backwards to expose the cut-out portion 4a, the apertures 20 are respectively aligned with the reel shaft insertion apertures 21.

The sliding closure member 11 comprises a flat plate 10 which lies parallel to the lower surface of the lower section 4 and side plates 12 along the left and right sides of the flat plate 10 which lie parallel to the outer surfaces of the left and right side walls of the lower section 4. Flanges (not clearly shown) are formed by bending the upper ends of the side plates 12 inwardly. The flanges are restrained vertically but not horizontally between the side walls of the upper and lower sections 3 and 4 after the casing 2 is assembled.

Contact pieces 15 extend upwards perpendicularly from the flat plate 10 at the front of the plate at positions which correspond to the cut-away portions 24 of the closure lid 9. The contact pieces 15 enable the recording reproducing apparatus to slide the closure 11 to the rear in preparation for opening the cassette 1 in a manner described later.

A hook 19 is formed on the front edge of the flat plate 10. The hook 19 is centered between the contact pieces 15. One leg 18b of a torsion spring 28, the coil of which is housed in the front portion of the lower section 3, engages the hook 19. The torsion spring exerts a forward biasing force on the sliding closure member 11. When the sliding closure member 11 is in its open position, as shown in FIG. 3, the torsion spring 18 is stressed and exerts a counteracting force biasing the sliding closure member 11 toward its closed position.

Figure 5:
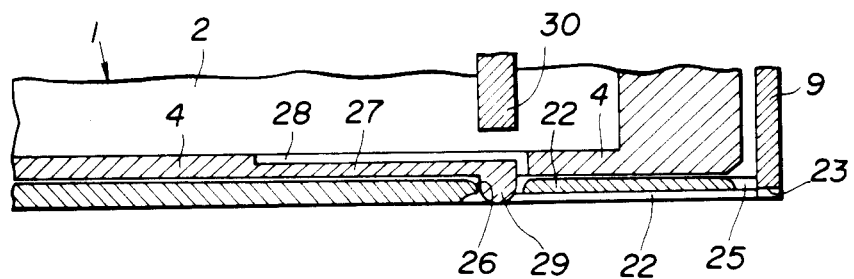
FIG. 5 is an enlarged partial section taken along line V—V of FIG. 4.

The sliding closure member 11 is also formed with a circular hole 26 and a semicircular cut-out 25. The semicircular cut-out 25 is located at the front end of the sliding closure member 11. A thin groove 22 is formed on the lower surface of the sliding closure member 11 in the region where the hole 26 and the cut-out 25 are formed. The groove 22 has a tapered end opening onto the front end of the sliding closure member 11. The hole 26 and the cut-out 25 are so arranged as to engage a locking projection or head 29 of a locking lever 27 which is integrally formed with the lower section 4. As will be appreciated, the locking lever 27 has a resilient lever section 27b which is thinner than the rest of the lower section for added flexibility. The locking head 29 projects downwardly from the free end of the locking lever 27b. Along both sides of the locking lever 27, elongated slots 28 separate the locking lever section 27b from the lower section 4. This enhances the flexibility of the locking lever 27 for freer move of its free end, as shown in FIG. 5. The locking head 29 has a rounded top which extends downwardly through the hole 26 or the cut-out 25. The height H of the locking head 29 is selected so that the top of the head 29 can lie flush with the lower surface of the sliding closure member within the groove 22 and so that the top of the head can rest atop the lower surface of the sliding closure member 11.

The lower section 4 of the casing is formed with a pair of guide grooves 14 extending along each of the side walls parallel to each other and to stepped rests. Neither the rests nor the guide grooves 14 are as deep as the arms 9a and 9b of the closure lid 9 are thick. The stepped rests receive the upper edges 11g of the sliding closure 11. Also, the guide groove 14 slidably receives inwardly depressed indentations formed in the side plates 12 of the sliding closure 11. Sliding engagement between the rests and the edges and between the guide grooves 14 and the indentations 13 guides sliding movement of the sliding closure 11 with respect to the cut-out portion 4a along the side walls of the lower section 4.

Positioning holes are formed through the bottom of the lower section 4 directly under the tape guide columns respectively.

In the shown construction, when the tape cassette 1 is not in use, the closure lid 9 is in its closed position shown in FIGS. 1 and 2 to cover the front opening. At the same time, the sliding closure member 11 is in its closed position (FIGS. 1 and 2), thus covering the cut-out 4a. In this case, the locking head 29 of the locking lever 27 is in engagement with the hole 26 as shown in FIGS. 2 and 3. At the closed position, the upper edge of the sliding closure member 11 abuts the lower edge of the arms 9a and so restricts pivotal movement of the pivotal closure lid 9. Therefore, the pivotal closure lid 9 and the sliding closure member 11 are held at the closed positions.

It should be appreciated that, although a specific magnetic tape cassette structure has been disclosed hereabove to facilitate better understanding of the preferred embodiment of the recording and/or reproducing apparatus, this specific magnetic tape cassette structure is not essential to the present invention. The preferred embodiment of the recording and/or reproducing apparatus is applicable to various kinds of the magnetic tape cassette, such as those disclosed in the U.S. patent applications Ser. Nos. 678,813 filed on Dec. 6, 1984, 704,943 filed on Feb. 25, 1985, and 711,521 filed on Mar. 14, 1985, now U.S. Pat. No. 4,683,510, which are respectively correspond to the British Patent First Publications Nos. 2,152,009 and 2,155,905, and the European Patent First Publication No. 0160822, which are all assigned to the assignee of the present invention. The contents of the aforementioned publications are hereby incorporated by reference for the sake of disclosure. Also, the U.S. patent application Ser. No. 649,725 filed on Sept. 12, 1984 and assigned to the assignee of the present invention discloses a sliding closure member which holds the pivotal closure lid in its closed position while itself in the closed position. The European Patent First Publication No. 0135195 corresponds to the aforementioned United States Patent Applications. The content of the United States Patent Application are hereby incorporated by reference for the sake of disclosure.

Recording and/or Reproducing Apparatus

Figure 6:
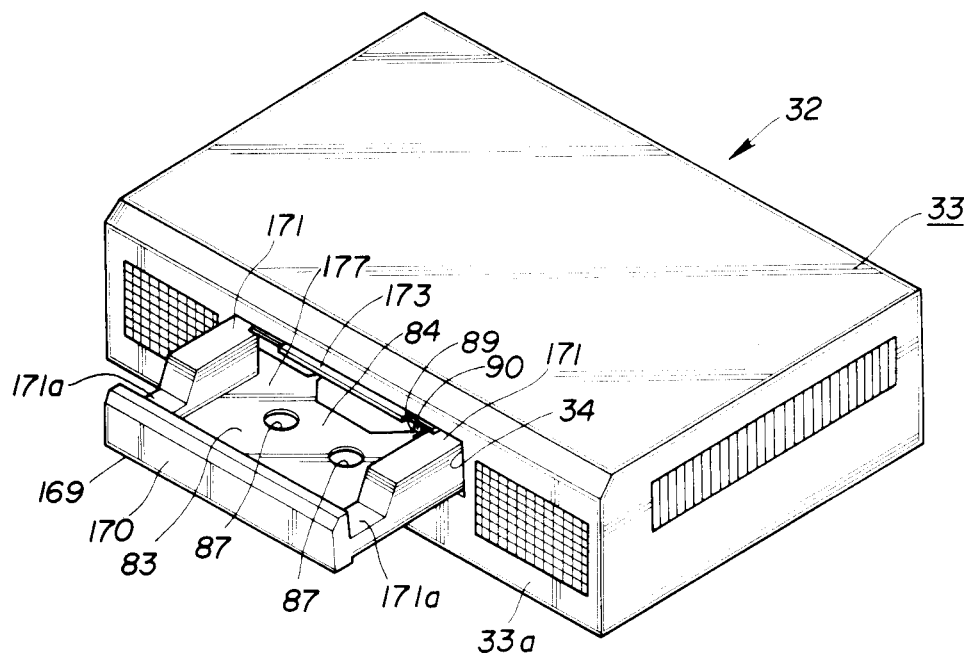
FIG. 6 is a perspective view of the preferred embodiment of a front-loading recording and/or reproducing apparatus according to the present invention, which is designed for recording and reproduction of magnetic tape cassettes.

Referring now to FIGS. 6 to 16, the first embodiment of a front-loading recording and/or reproducing apparatus, which may be designed for PCM recording and/or reproduction, is generally represented by the reference numeral 32. The recording and/or reproducing apparatus 32 has a housing 33. As shown in FIG. 6, a front panel 33a of the housing 33 is formed with a cassette receptacle opening 34 through which a cassette holder 83 (described in detail later) moves between an eject position in which it projects from the front panel 33a and a retracted position in which the magnetic tape cassette 1 resides within the housing 33.

Although not clearly shown in the accompanying drawings, the front panel 33a is provided with various manually operable switches, such as a power switch, mode selector switches, an eject switch and so forth.

In the preferred embodiment of the recording and/or reproducing apparatus, the magnetic tape cassette 1 of FIGS. 1 to 5 can be put on the cassette holder 83 when the latter is in its eject position. Simply putting the magnetic tape cassette 1 on the cassette holder 83 automatically initiates a loading operation in which the locking engagement between the pivotal closure lid 9 and the sliding closure member 11 is released, and those element are moved to their respective open positions and locked in their open positions. Specifically, after the magnetic tape cassette 1 is placed on the cassette holder 83, the latter is automatically drawn into the apparatus housing 33 to the loading position. At first, the cassette holder 83 is moved horizontally and backwards. During this movement, the magnetic tape cassette 1 is moved horizontally with respect to the cassette holder, which releases the locking engagement between the pivotal closure lid and the sliding closure member of the magnetic tape cassette and moves them to their respective open positions. Then, the cassette holder 83 is lowered to load the magnetic tape cassette into the recording and/or reproducing apparatus.

Each component of the preferred embodiment of the recording and/or reproducing apparatus will be described herebelow.

BASE PLATE (FIGS. 7, 8, 10 and 13 to 15)

A base plate of the preferred embodiment of the recording and/or reproducing apparatus is generally represented by the reference numeral 35. The base plate 35 is housed within the apparatus housing 33. The base plate 35 is generally rectangular but may be square. The base plate 35 is integrally formed with a pair of lateral supporting strips 35a extending along its front edge.

Figure 13:
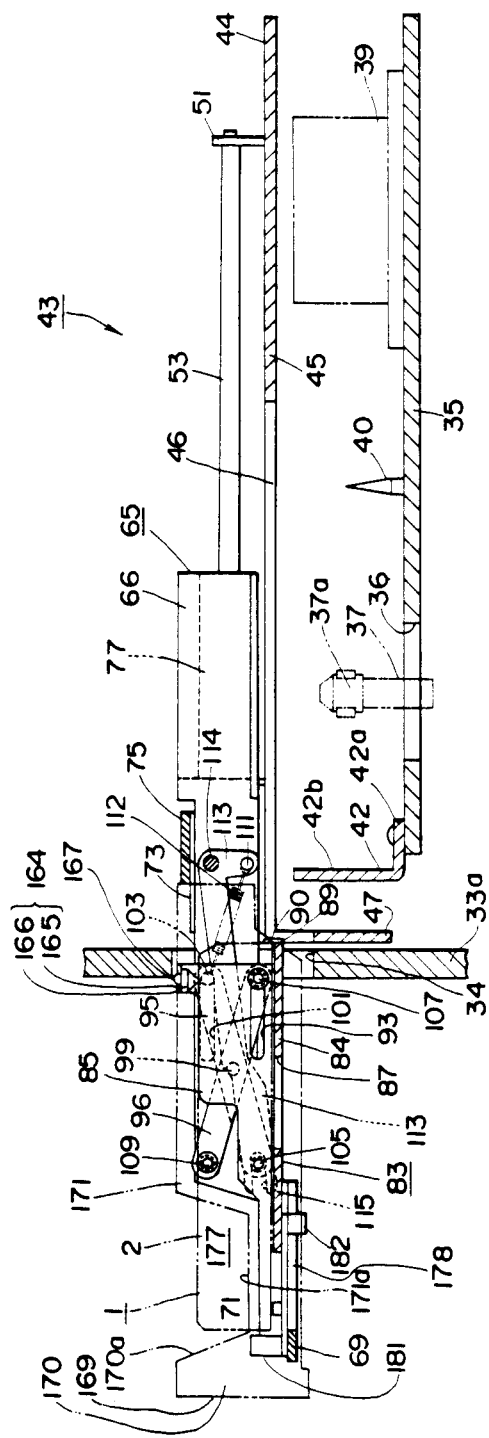
FIG. 13 is a section taken along line XIII—XIII of FIG. 7.

The base plate 35 is formed with a laterally elongated opening 36 to admit reel shafts 37 and 38 which are rotatably supported on a reel base (not shown). As shown in FIGS. 13 and 14, the reel shafts 37 and 38 are respectively provided with heads 37a and 38a engageable with the corresponding reel hubs 6 and 7 of the magnetic tape cassette 1. The reel shafts 37 and 38 with the heads 37a and 38a extend through the elongated opening 36 until the heads project above the base plate 35.

A rotary head drum 39 is mounted near the rear edge of the base plate 35, as shown in FIGS. 13 and 14. In the shown embodiment, the rotary head drum 39 is designed for PCM audio recording and/or reproduction.

A pair of positioning pins 40 and 41 extend upwards from the base plate 35. The positioning pins 40 and 41 lie rearward of the elongated opening 36 and are spaced apart. The positioning pins 40 and 41 are positioned so as to oppose and engage positioning holes formed in the lower section 4 of the magnetic tape cassette, as will be described later.

Figure 7:
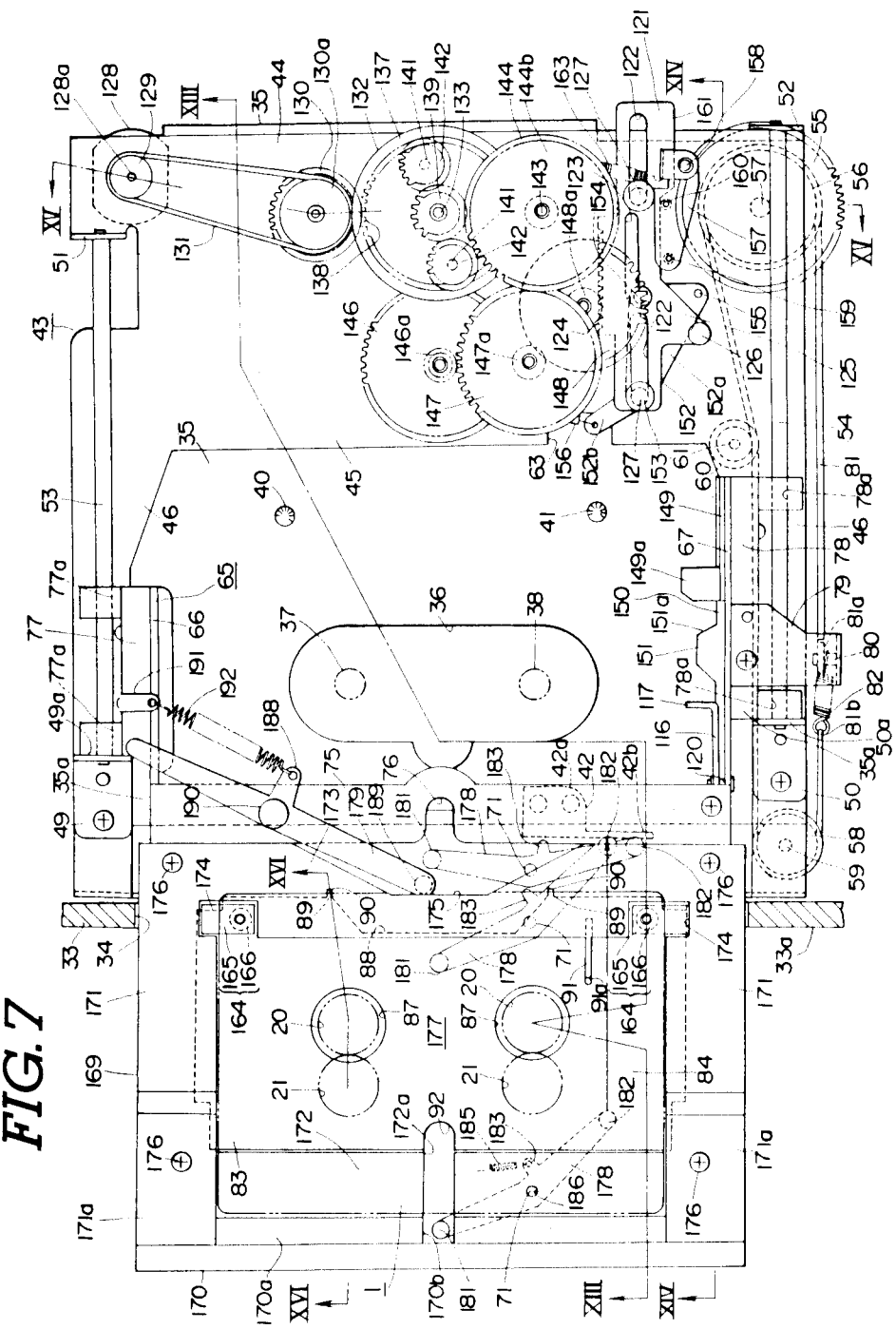
FIG. 7 is a plan view of the recording and/or recording apparatus of the invention, which shows the first embodiment of a magnetic tape cassette loading system with a cassette holder in the eject position.

A contact strip 42 is fixed to the front edge of the base plate 35 at a point to the right of the center of the base plate, as viewed in FIG. 7. The contact strip 42 has a horizontal section 42a and a vertical section 42b. The horizontal section 42a is fixedly secured to the upper surface of the front edge of the base plate 35 by means of fastening screws or bolts. The vertical section 42b extends above the horizontal section 42a and has a forward-facing contact face. The contact face of the vertical section 42b is intended to abut a cassette pusher lever 178 which will be described later, in order to cause pivotal movement of the cassette pusher lever 178 during cassette loading.

It should be noted that a tape drive mechanism, a tape loading mechanism which is adapted to wrap and unwrap the magnetic tape 5 onto and from the rotary head drum 39, and so forth are mounted on the base plate 35. However, in order to simplify the drawings and avoid unnecessary confusion, those mechanisms which are not directly related to the subject matter of the present invention have been left out of the drawings and disclosure.

In practice, the preferred embodiment of the recording and/or reproducing apparatus according to the invention employs a tape loading mechanism as disclosed in the co-pending U.S. patent application Ser. No. 827,640, filed on Feb. 10, 1986, and the European Patent Application No. 86 301 040.1, filed on Feb. 14, 1986, which European Patent Application corresponds to the aforementioned U.S. patent application. Both of the above-identified co-pending applications have been assigned to the assignee of the present invention. The contents of the aforementioned co-pending applications are hereby incorporated by reference for the sake of disclosure.

CASSETTE LOADING MECHANISM (FIGS. 7 and 9 to 15)

A cassette loading mechanism is generally represented by the reference numeral 43. The cassette loading mechanism 43 comprises the cassette holder 84 which receives the magnetic tape cassette 1 and carries it between the aforementioned eject and loading positions, a sliding frame 65 supporting the cassette holder so as to be free to move vertically, the sliding frame 65 itself being free to move longitudinally relative to the apparatus housing 33, a mechanical chassis 44 movably mounting the sliding frame, and a drive mechanism for the cassette loading mechanism. The cassette loading mechanism 43 also comprises a cassette pushing mechanism for pushing the cassette into the apparatus so as to open the pivotal closure lid 9 and the sliding closure member 11 upon loading and out of the apparatus for closing the pivotal closure lid and the sliding closure member upon ejecting.

Each component of the cassette loading mechanism will be described herebelow in a corresponding sub-section.

MECHANICAL CHASSIS (FIGS. 7, 9 to 11 and 14 to 16)

The mechanical chassis 44 is generally rectangular. The mechanical chassis 44 has a base section 45 forming the rear half thereof. A pair of longitudinal strip sections 46 extend longitudinally from opposite sides of the front edge of the base section 45. The two longitudinal strip sections 46 are essentially parallel to each other. As best shown in FIG. 10, the front ends of the longitudinal strip sections 46 are bent downward until the bent sections lie perpendicular to the horizontal plane of the remaining sections. A transverse front end strip section 47 is formed integrally with the vertically bent front ends of the longitudinal strip sections 46. The transverse section 47 thus connects the two bent front end sections of the longitudinal strip sections 46. The transverse section 47 is coplanar with the bent front end sections of the longitudinal strip sections 46.

A plurality of cylindrical supports 48 are interposed between the support strips 35a of the base plate 35 and the horizontal portion of the longitudinal strip sections 46, and between the base plate 35 and the base section 45 of the mechanical chassis 44. The cylindrical supports 48 serve to support the mechanical chassis 44 above the base plate 35 while holding them essentially parallel. The cylindrical supports 48 also serve as spacers maintaining a predetermined clearance between the mechanical chassis 44 and the base plate 35.

L-shaped brackets 49 and 50 are mounted near the front ends of the longitudinal strip sections 46. The brackets 49 and 50 are secured onto the upper horizontal surfaces of the longitudinal strip sections 46 by means of fastening screws. The brackets 49 and 50 respectively have vertical sections 49a and 50a. As will be seen from FIG. 10, the vertical section 49a extends higher than the vertical section 50a.

A vertical tab 51 on the right-hand edge and slightly frontward of the rear edge of the mechanical chassis 44 opposes the vertical section 49a. Similarly, the left-hand corner of the rear edge of the mechanical chassis 44 is bent upwardly to form a vertical tab 52. The tabs 51 and 52 are longitudinally aligned with the vertical sections 49a and 50a of the brackets 49 and 50 respectively. Essentially cylindrical guide rails 53 and 54 extend between respective pairs of the vertical tabs and the vertical sections 49a, 51, and 50a, 52. These guide rails 53 and 54 allow the sliding frame 65 to slide longitudinally. The guide rails 53 and 54 extend parallel to each other and to the upper horizontal plane of the mechanical chassis 44.

A wire driver gear 55 is suspended beneath the mechanical chassis 44 by means of a stationary shaft 57 which extends downwards from the lower surface of the rear-right corner of the base section 45. The wire driver gear 55 is rotatable about the stationary shaft 57. A wire pulley 56 is integrally formed with the wire driver gear 55 for rotation therewith.

A wire pulley 58 is mounted below and near the front end of the right-hand longitudinal strip section 46. The wire pulley 58 is rotatably supported by a stationary pulley shaft 59 extending from the lower surface of the right-hand longitudinal strip section 46. As will be seen from FIGS. 6 and 7, the wire pulley 58 is of smaller diameter than the wire pulley 56 integrally formed with the wire driver gear 55.

A guide pulley 60 is suspended beneath the mechanical chassis 44. The guide pulley 60 is positioned between the wire pulleys 56 and 58 near the juncture of the right-hand longitudinal strip section 46 and the base section 45. The guide pulley 60 is rotatably supported by a pulley shaft 61 which extends downward from the mechanical chassis 44. A drive wire 81 is stretched between the wire pulleys 56 and 58 via the guide pulley 60.

An essentially L-shaped strip 62 extends downwards from the base section 45 of the mechanical chassis 44. The strip 62 is formed by cutting around the corresponding section of the base section 45 and bending it into an L-shape with its horizontal section pointing transversely.

A cut-out 63 is formed slightly to the left of the center of the front edge of the base section 45, as best shown in FIG. 10. An opening 64 is passes through the base section 45 near the cut-out 63.

The mechanical chassis 44 constructed as set forth above is received within the apparatus housing 33. When the mechanical chassis 44 is set within the housing 33, the vertical front face of the transverse strip section 47 opposes the back surface of the front panel 33a. In addition, the upper edge of the transverse strip section 47 lies in essentially the same horizontal plane as the lower edge of the cassette receptacle opening 34.

SLIDING FRAME
(FIGS. 7, 9, 10, 13 to 15)

The sliding frame 65 is supported by the guide rails 53 and 54 described above. The sliding frame 65 is free to move longitudinally along the guide rails 53 and 54.

Figure 12:
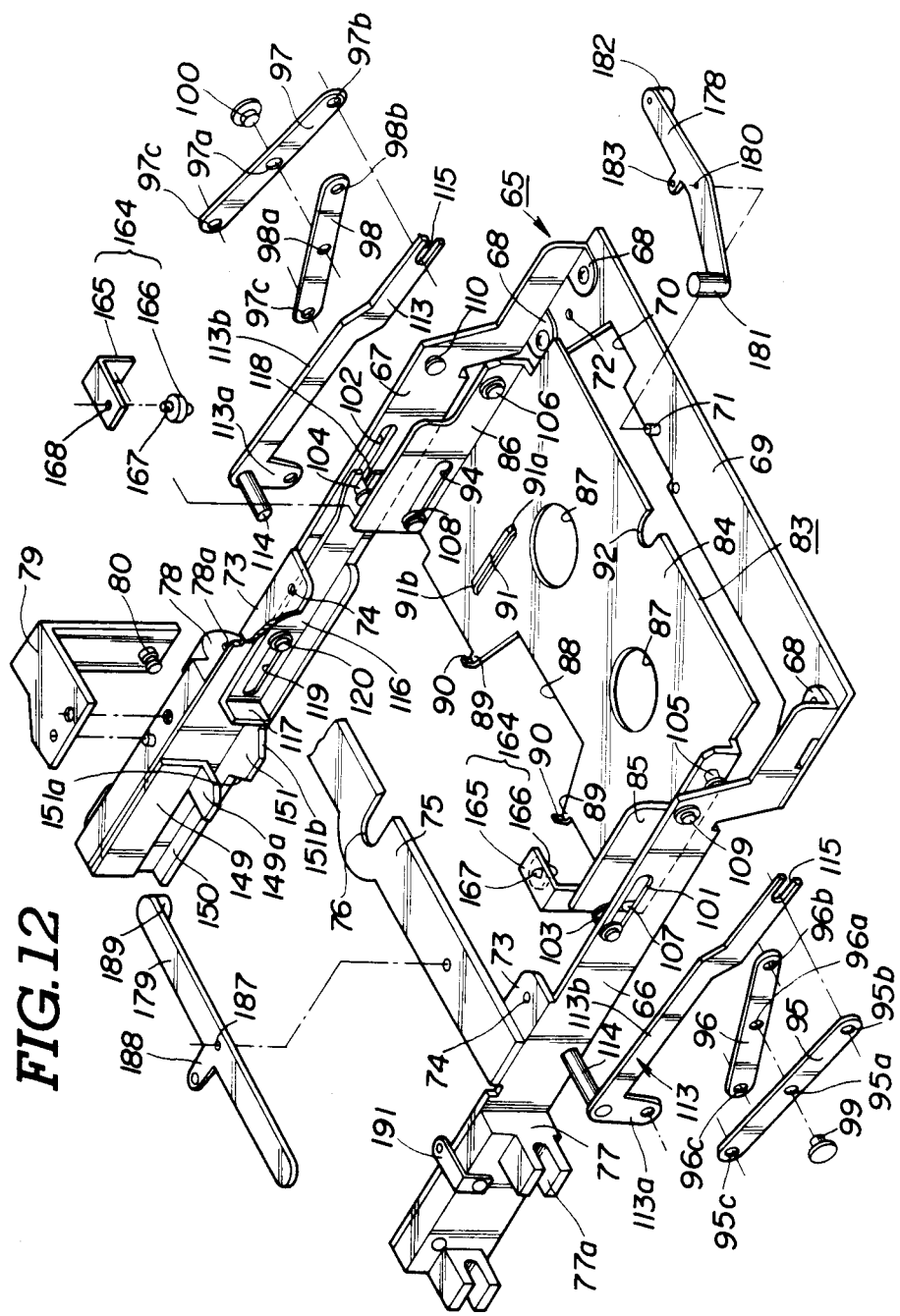
FIG. 12 is an exploded perspective view of a cassette holder and associated mechanism in the first embodiment of the magnetic tape cassette loading system.

The sliding frame 65 has a pair of side walls 66 and 67. The side walls 66 and 67 are longitudinally elongated and have essentially the same configuration. However, the left-hand side wall 67 is slightly longer than the right-hand side wall 66. The side walls 66 and 67 have matching front end sections which lie in a lower plane than the rest of the side wall length. The front end sections are connected to the rest of the side walls 66 and 67 by dog-legs, as best shown in FIG. 12. Pairs of tabs 68 extend horizontally and laterally inward from the lower edges of the front end sections.

The sliding frame 65 also has a horizontal front plate 69. The lateral edges of the front plate 69 are secured to the tabs 68 of the side-walls 66 and 67 by means of fastening screws. The rear edge of the front plate 69 has a cut-out 70 near its left-hand edge. A pivot pin 71 protrudes from the upper surface of the front plate 69 near the cut-out 70 but shifted slightly toward the center. The pivot pin 71 pivotably supports cassette pusher lever 178 which will be described later.

The front plate 69 also has threaded holes 72 near both lateral edges.

Supporting strips 73 extend inward from the upper edges of the side walls 66 and 67. The supporting strips 73 lie horizontally and slightly rearward of the longitudinal center of the side walls. Threaded holes 74 pass through the supporting strips 73.

A lateral cross-member 75 is secured at both ends to the rear parts of the supporting strips 73. A U-shaped cut-out 76 is centered in the front edge of the cross-member 75.

A guide block 77 is secured to the outer surface of the side wall 66 by means of fastening screws. The guide block 77 is positioned at the rear end of the side wall 66 and has a pair of guide rail grippers 77b with outward-facing U-shaped grooves 77a. The U-shaped grooves 77a can slidingly engage the aforementioned guide rail 53 of the mechanical chassis to facilitate sliding movement. Similarly, a guide block 78 is fixed to the outer surface of the side wall 67 by at its rear end means of fastening screws. The guide block 78 has a pair of outward extensions 78b, through which guide rail receiving holes 78a are formed. The aforementioned guide rail 54 of the mechanical chassis passes through the holes 78a to allow longitudinal sliding movement of the latter. The vertical sections 49a and 50a of the brackets 49 and 50 which support the front ends of the guide rails 53 and 54 as set forth above serve as stoppers limiting frontward movement of the guide blocks 77 and 78. Similarly, the vertical tabs 51 and 52 of the mechanical chassis, which support the rear ends of the guide rails 53 and 54 as set forth above serve as stoppers limiting rearward movement of the guide blocks 77 and 78.

It should be noted that the position of the sliding frame 65 at which the guide blocks 77 and 78 are in contact with the vertical sections 49a and 50a of the brackets 49 and 50, will hereafter be referred to as the "drawn-out position". The position of the sliding frame 65 at which the guide blocks 77 and 78 are in contact with the vertical tabs 51 and 52 will hereafter be referred to as the "drawn-in position". At the drawn out position, the sliding frame 65 protrudes from the apparatus housing 33 through the cassette receptacle opening 34 of the front panel 33a. At the drawn in position, the sliding frame 65 resides fully within the apparatus housing.

The position of the cut-out 70 in the front plate 69 of the sliding frame 65 is laterally opposed to the position of the contact strip 42 of the base plate 35. When the sliding frame 65 is in the drawn in position, the peripheral edge of the cut-out 70 is separated from the contact strip 42.

A generally L-shaped plate 79 is fixed to the upper surface of the guide block 78. The plate 79 has an essentially horizontal section secured to the guide block 78 by means of one or more fastening screws, and a vertical section extending downward from the outwardly protruding free end of the horizontal section. Generally, the plate 79 passes over the guide block 78. The vertical section of the plate 79 has a flat surface opposing the side wall 67. A pin 80 protrudes from the vertical section of the plate 79 toward the side wall 67. The pin 80 is designed to anchor the ends of a drive wire 81 used to drive the sliding frame longitudinally along the guide rails 53 and 54.

WIRE (FIGS. 7, 9, 10 and 15)

The drive wire 81 has loops 81a and 81b at both ends. The loop 81a engages the pin 80 of the L-shaped plate 79. The drive wire 81 extends rearward from the loop 81a and is wound around the wire pulley 56 about 1 and half turns. From the wire pulley 56, the drive wire 81 extends frontwards via the guide pulley 60 and is wound another 1 and half turns around the wire pulley 58. Then, the drive wire 81 again extends rearwards and the loop 81b is attached to the pin 80 via a limiter spring 82. The limiter spring 82 is designed to absorb excessive tension applied to the drive wire.

When the sliding frame 65 is to move from the drawn in position to the drawn out position, the wire pulley 56 is driven clockwise as viewed in FIG. 7 by means of the wire driver gear 55. The drive wire 81 is thus driven so as to pull the sliding frame 65 forward. This driving directions of the wire driver gear 55, the wire pulley 56 and the drive wire 81 will hereafter be referred to as "forward driving direction". On the other hand, in order to drive the sliding frame 65 from the drawn out position to the drawn in position, the wire pulley 56 with the wire driver gear 55 are driven counterclockwise as viewed in FIG. 7. According to this, the drive wire 81 is driven to drive the sliding frame 65 rearward. This driving direction of the wire driver gear 55, the wire pulley 56 and the drive wire 81 will hereafter be referred to as "backward driving direction".

CASSETTE HOLDER (FIGS. 7 to 9, 12 to 14, 16, 17(A) and 17(B))

The cassette holder 83 is generally in the form of a rectangular box with its elongated sides lying in the lateral direction of the apparatus 32. The lateral width of the cassette holder 83 is slightly less than the distance between the side walls 66 and 67 of the sliding frame 65. The cassette holder 83 has an essentially rectangular, laterally elongated bottom plate 84. Side walls 85 and 86 extend upward from the lateral edges of the bottom plate 84. The bottom plate 84 has a pair of through openings 87 which are spaced apart at positions corresponding to the reel shaft insertion apertures 21 of the magnetic tape cassette 1.

The bottom plate 84 also has a cut-out 88 at the center of its rear edge and rearward projecting strips 89 at the lateral ends of the cut-out 88. Each strip 89 has an upward extending contact piece 90. The contact pieces 90 serve as dogs for pushing the sliding closure member 11 of the magnetic tape cassette as the sliding closure member 11 is driven from the closed position to the open position.

A longitudinally elongated projection 91 is formed on the bottom plate 84. The projection 91 projects upwards from the plane of the bottom plate 84. The projection 91 is disposed at a lateral position corresponding to the groove 22 of the sliding closure member 11 of the magnetic tape cassette 1 discussed above and its height essentially matches the depth of the groove 22. The front and rear ends 91a and 91b of the projection 91 taper down toward the plane of the plate 84. The projection 91 serves to release the locking engagement between the aforementioned locking head 29 of the locking lever 27 and the cut-out 25 or the hole 26 of the sliding closure member 11 when the magnetic tape cassette 1 moves longitudinally relative to the cassette holder 83.

It should be appreciated that the projection 91 may be formed on the bottom plate 84 by pressing. However, if necessary, the projection 91 can be formed independently of the bottom plate and secured to the bottom plate at the proper position thereafter. In the later case, it would be convenient to mold the projection out of a synthetic resin.

The bottom plate 84 of the cassette holder 83 also has an essentially U-shaped recess 92 at the center of its front edge. The side walls 85 and 86 have longitudinal guide openings 93 and 94. The guide openings 93 and 94 are located near the rear ends of the side walls 85 and 86 respectively.

CASSETTE HOLDER SUPPORTING ARM (FIGS. 8, 9, 12 to 14)

Two pairs of arms 95, 96, 97 and 98 are associated with the cassette holder 83 set forth above so that they can support the cassette holder in a vertically movable fashion. The arms 95 and 96 are disposed to the right of the cassette holder 83 and the arms 97 and 98 are arranged to the left. The arms 95, 96, 97 and 98 have circular holes 95a, 96a, 97a and 98a through their centers. The circular openings 95a and 96a of one pair of the arms 95 and 96 are aligned with each other. Similarly, the circular openings 97a and 98a of the arms 97 and 98 are aligned with each other. Each pair of arms 95, 96 and 97, 98 is pivotably connected by means of a connecting pin 99 and 100 which extends through the circular openings 95a, 96a, and 97a, 98a, respectively.

The aforementioned side walls 66 and 67 of the sliding frame 65 have longitudinal guide openings 101 and 102. Movable pins 103 and 104 extend through respectively corresponding guide openings 101 and 102, and so are free to slide longitudinally along the guide openings. Fixed pins 105 and 106 extend laterally outward from the front ends of the side walls 85 and 86 of the cassette holder 83. The arms 95 and 96 have through holes 95b, 95c and 96b and 96c at either longitudinal end. Similarly, the arms 97 and 98 have through holes 97b, 97c and 98b, 98c at either longitudinal end. The movable pins 103 and 104 respectively engage the through holes 95c and 97c of the arms 95 and 97. On the other hand, the fixed pins 105 and 106 engage the through holes 95b and 97b. Therefore, the fixed pins 105 and 106 form pivots for the arms 95 and 97.

Movable pins 107 and 108 extend through the guide openings 93 and 94 in the side walls 85 and 86 of the cassette holder 83. The movable pins 107 and 108 are thus free to move along the guide openings 93 and 94.

The movable pins 107 and 108 engage the through holes 96c and 98c of the arms 96 and 98. The through holes 96b and 98b in the other ends of the arms 96 and 98 are pivotally engaged with fixed pins 109 and 110 extending from the side walls 66 and 67 of the sliding frame 65. Therefore, the arms 96 and 98 are pivotable about the fixed pins 109 and 110.

With the supporting structure set forth above, the cassette holder 83 is supported above the sliding frame 65 in a vertically movable fashion. The vertical movement of the cassette holder 83 with respect to the sliding frame 65 is actuated by pivotal movement of each pair of arms 95, 96 and 97, 98 about the pivot pins 99 and 100, as shown in FIGS. 14(B) and 14(C).

MECHANISM FOR VERTICALLY ACTUATING CASSETTE HOLDER

(FIGS. 7, 8 to 10 and 12 to 14(C)

Figure 9:
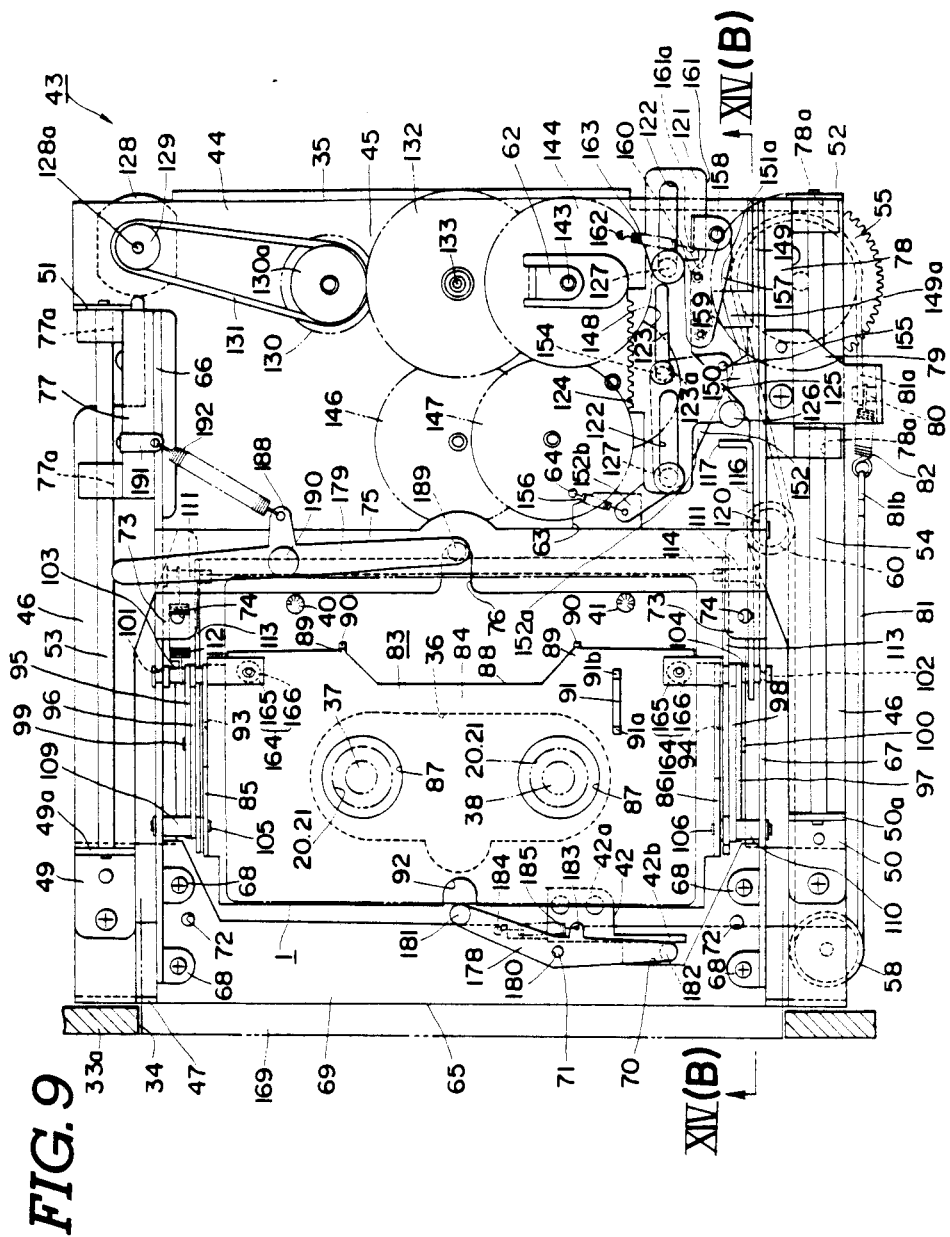
FIG. 9 is a fragmentary plan view of the recording and/or reproducing apparatus following completion of the cassette loading process and from which non-essential components have been removed in order to clearly show the positions of the essential components.

Arm support pins 111 extend from the mutually opposing inner surfaces of the side walls 66 and 67 of the sliding frame 65. The arm support pins 11 are longitudinally located at positions corresponding to the supporting strips 73. One end of a bias spring 112 engages one of the arm support pins 111 protruded from the side wall 66 of the sliding frame. The other end of the bias spring 112 engages the movable pin 103 in order to bias the latter rearward, as shown in FIG. 9.

When the biasing force exerted on the rear ends of the arms 95 and 97, at which the circular openings 95c and 97c are formed, the rear ends of the arms 95 and 97 shift toward the front ends of the arms 96 and 98, at which the circular holes 96b and 98b are formed. Thus, the distance between the rear ends of the arms 95 and 97 and the front ends of the arms 96 and 98 is reduced. This causes frontward and downward shifting of the pivot points between the arms 95, 96 and 97, 98. As a result, since the front ends of the arms 96 and 98 and the rear ends of the arms 95 and 97 are connected to the sliding frame 65, the cassette holder 83 is shifted downwardly toward the downwardly shifted position. On the other hand, when the rear end of the arm 95c is moved backwardly by the bias spring 112, the relative distance between the pin 103 and the pin 109 expands. This causes rearward and upward shifting of the pivot point at which the arms 95 and 96 are pivotally connected by means of the pivot pin 99. This results in a rearward shifting of the rear end of the arm 96, at which the circular opening 96 is formed. Therefore, the movable pin 107 engaging the guide opening 93 of the side wall 85 of the cassette holder 83 is shifted rearwardly along the guide opening 93.

Since the arms 95 and 96 pivot about the pivot pin 99, the frontward movement of the front end of the arm 95 includes a component of movement causing an upward shift. Therefore, the fixed pin 105 fixed to the side wall 85 of the cassette holder 83 is shifted upward during frontward movement of the front end of the arm 95. Similarly, the rearward movement of the rear end of the arm 96 includes a component of movement causing an upward shift. Therefore, the movable pin 107, when shifted rearward due to rearward movement of the rear end of the arm 96, also shifts upward. Therefore, the cassette holder 83 shifts upward. This relative pivotal movement of the arms 95 and 96 and shifting of the cassette holder 83 is limited by the positions of the rear end of the elongated guide openings 93 and 101. At the uppermost position of the cassette holder, the cassette holder 83 opposes the sliding frame 65 as illustrated in FIG. 14(A). This cassette holder position will be hereafter referred to as the "upward shifted position".

The cassette holder 83 is vertically movable between the aforementioned upward shifted position and a downward shifted position, at which the cassette holder is positioned as shown in FIG. 14(B). Movement of the cassette holder 83 from the upward shifted position to the downward shifted position is realized by an actuation mechanism which will be described later. When the actuation mechanism is activated, the front end of the arm 95 and the rear end of the arm 96 are pivotally shifted to approach toward each other. Specifically, this pivotal movement of the arm 95 includes a component of movement causing a downward shift at the front end. Likewise, the pivotal movement of the arm 96 includes a component of movement causing a downward shift at the rear end. Since both of the front end of the arm 95 and the rear end of the arm 96 are connected to the cassette holder 83 via the pins 105 and 107, this downward movement of the front end of arm 95 and the rear end of the arm 96 causes downward movement of the cassette holder 83. The magnitude of downward shift of the cassette holder 83 is determined by the position of the front ends of the guide openings 93 and 101. The downward shifted position referred to in the disclosure represents the lowermost cassette holder position determined by the positions of the front ends of the guide openings.

The aforementioned actuation mechanism comprises a pair of actuation levers 113 disposed outside of each of the side walls 66 and 67 of the sliding frame 65. The actuation levers 113 are of identical configuration. Each actuation lever 113 has an essentially vertical section 113a and an essentially horizontal section 113b. The vertical section 113a extends downward from the rear end of the horizontal section 113b. The lower end of the vertical section 13a has a circular hole pivotally engaging the support pin 111. At the juncture of the vertical section 113a and the horizontal section 113b, the actuation lever 113 is connected to one end of a connection rod 114. The connection rod 114 serves to coordinate the movements of the actuation levers 113.

The front end of the horizontal section 113b of each of the actuation levers 113 has an essentially U-shaped recess 115. The recesses 115 engage the fixed pins 105 and 106 fixed to the side walls 85 and 86 of the cassette holder 83. It will be appreciated that the recesses 115 can disengage from the corresponding pins 105 and 106.

The actuation levers 113 serve to actuate the arms 95 and 96 and the arms 97 and 98 for upward and downward shifting of the cassette holder 83. The actuation levers 113 are associated with the sliding frame 65 so as to be actuated according to the longitudinal position of the sliding frame.

A flat, elongated slider 116 opposes the inner surface of the side wall 67 of the sliding frame 65. The slider 116 generally comprises a longitudinal plate with an inwardly bent rear end 117 and an essentially U-shaped recess 118 in its front end. The slider 116 also has a longitudinal elongated hole 119 near the inwardly bent rear end 117.

The recess 118 at the front end of the slider 116 is releasably engageable with the movable pin 104 which extends through the guide opening 102 of the side wall 67 described above. On the other hand, a guide pin 120 extends through the longitudinal hole 119. The guide pin 120 extends from the inner surface of the side wall 67 of the sliding frame 65 and engages the longitudinal hole 119 so as to be free to move therealong.

The slider 116 is in its rearmost position when the cassette holder 83 is in the upward shifted position and is at rest while the cassette holder 83 is at rest in the upward shifted position. At this time, the guide pin 120 remains in contact with the front edge of the elongated hole 119. On the other hand, as the cassette holder 83 shifts downward toward the downward shifted position, the slider 116 moves frontwardly by a frontward shifting force exerted against its inwardly bent rear end 117. The mechanism for exerting this frontward shifting force will be described later.

The mechanism for vertically actuating the cassette holder also includes a rack plate 121 mounted near the rear end of the mechanical chassis 44 (FIG. 10). The rack plate 121 is generally longitudinally elongated and has guide slots 122 near its front and rear ends. The guide slots 122 extend longitudinally so as to guide longitudinal movement of the rack plate 121 which engages guide pins 127 extending vertically from the upper surface of the mechanical chassis 44. The rack plate 121 also has a longitudinal guide opening 123 between the guide slots 122. The front end of the guide opening 123 extends perpendicular to the longitudinal axis of the major section thereof. This bent end of the guide opening 123 serves as a locking recess 123a. The guide opening 123 engages a pin 154 which will be described later.

The rack plate 121 has rack teeth 124 along its right-hand edge and an essentially lateral arm 125 on the other edge. The free end of the arm 125 has a vertical pusher member 126. The pusher member 126 is generally cylindrical and abuts the aforementioned inwardly bent rear end 117 of the slider 116.

The rack plate 121 is normally positioned such that the front ends of the guide slots 122 are in contact with the guide pins 127. The rack plate 121 is held in this position until the sliding frame 65 reaches the aforementioned drawn-in position. This rack plate position will be hereafter referred to as the "rearward shifted position".

When the sliding frame 65 reaches the drawn-in position, the rack plate 121 is driven frontward by a driving mechanism which will be described later. When the sliding frame 65 reaches the drawn in position, the pusher member 126 at the free end of the arm 125 abuts the inwardly bent rear end 117 of the slider 116 as shown in FIG. 9.

As mentioned above, since the rack plate 121 is then driven toward the front, the pusher member 126 of the arm 125 pushes the inwardly bent rear end of the slider 116 frontward. Thus, the slider 116 and the movable pin 104 are shifted frontward. Therefore, the arm 97 is pivoted about the pivot pin 100 so that its rear end approaches the front end of the arm 98. The cassette holder 83 is thus shifted downward to the downward shifted position against the biasing force of the spring 112.

The frontward movement of the slider 116 is limited by the length of the elongated opening 119. Specifically, at the frontward shifted position, the rear end of the elongated opening 119 of the slider 116 comes into contact with the guide pin 120 also to prevent frontward movement. This rearward shifted position of the slider 116 corresponds to the downward shifted position of the cassette holder 83.

At this downward shifted position of the cassette holder 83, the reel shafts 37 and 38 with the heads 37a and 38a extend upward through the openings 87 of the cassette holder. Thus, cassette loading is completed.

When the rack plate 121 is driven rearward while the cassette holder 83 is in the downward shifted position, the frontward biasing force exerted on the movable pin 104 is released. As a result, the arms 95, 96 and 97, 98 are pivoted so as to allow the cassette holder 83 to be shifted from the downward shifted position to the upward shifted position by the biasing force of the spring 112.

DRIVING MECHANISM

Figure 8:
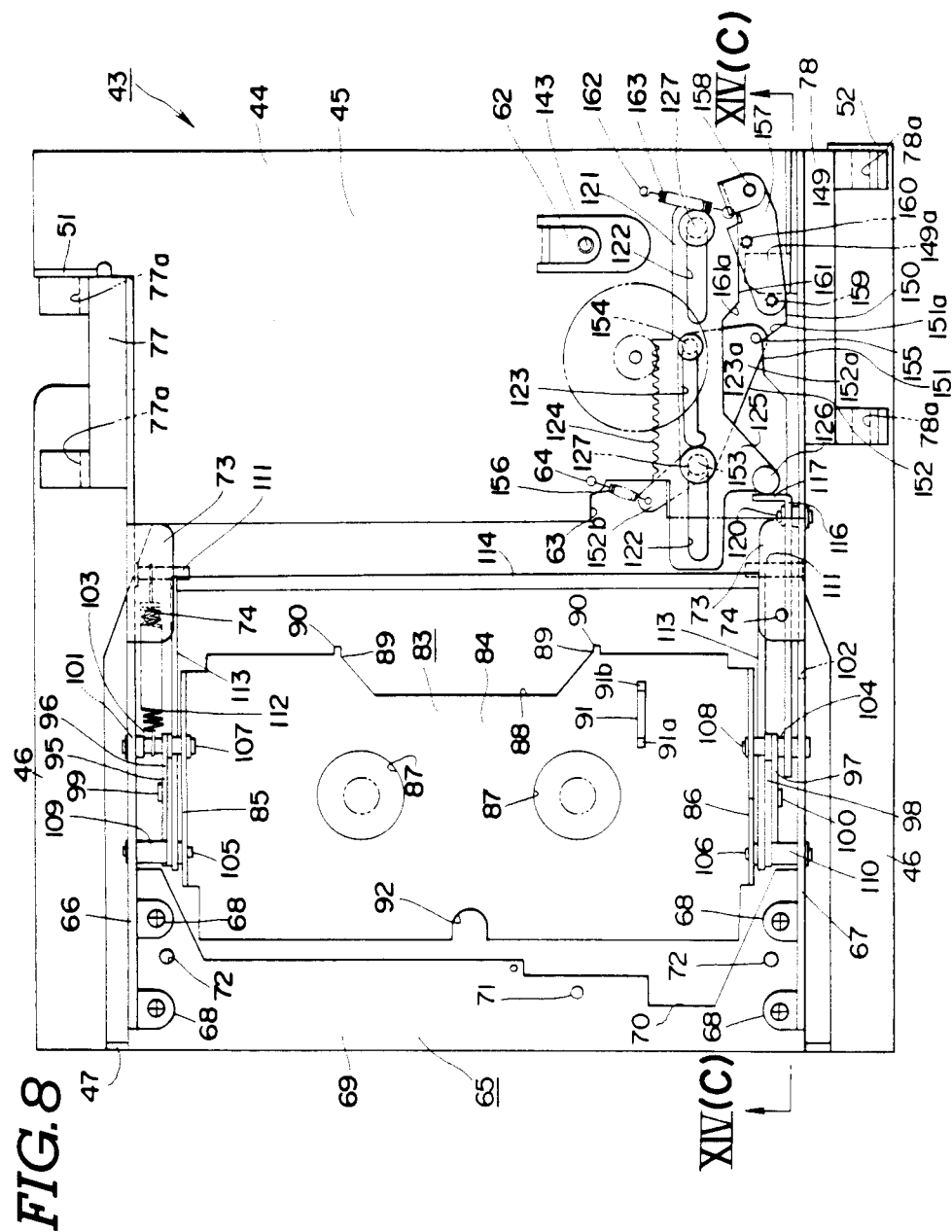
FIG. 8 is a plan view of the recording and/or reproducing apparatus similar to FIG. 7, but showing the first embodiment of the loading system in its loading position.

(FIGS. 7, 8 and 10)

A driving motor 128 is mounted on the lower surface of the mechanical chassis 44. The driving motor 128 has a drive shaft 128a extending upwardly through the mechanical chassis 44. A drive pulley 129 is positioned above the upper surface of the mechanical chassis 44 and secured to the upper end of the drive shaft 128a of the driving motor 128. Therefore, the drive pulley 129 is driven by the driving motor 128.

Figure 15:
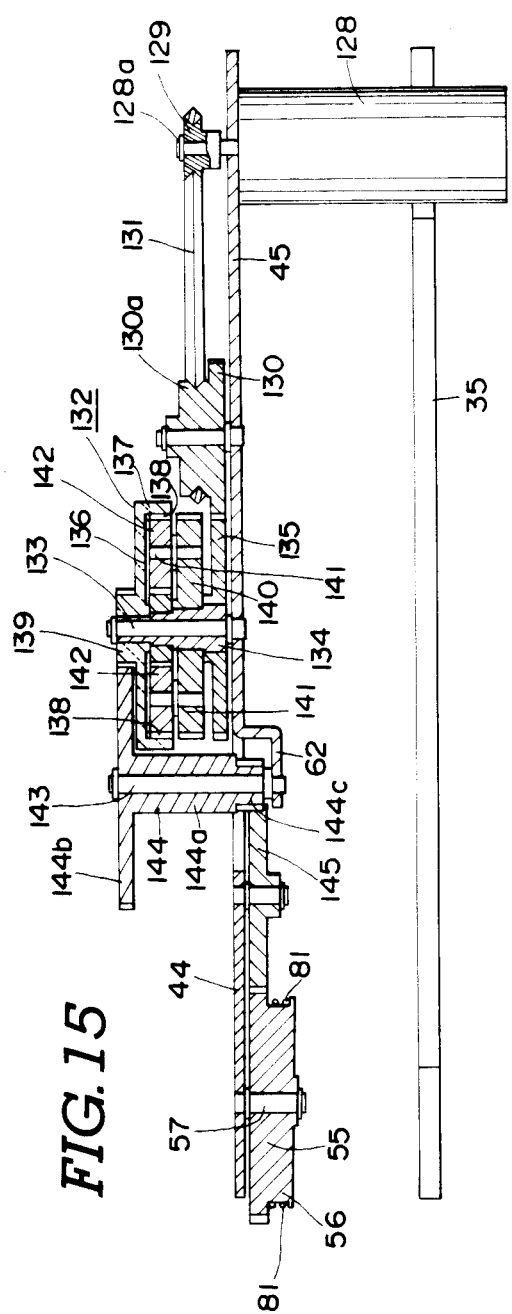
FIG. 15 is a section taken along line XV—XV of FIG. 7.
Figure 16:
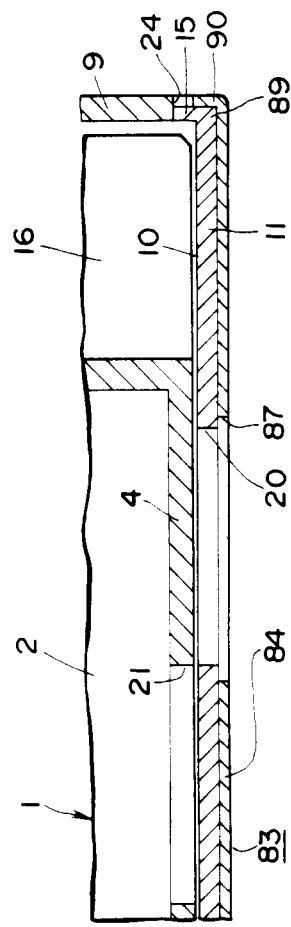
FIG. 16 is an enlarged section taken along line XVI—XVI of FIG. 7.

The drive pulley 129 is connected by means of an endless belt 131 to a pulley 130a which is integrally formed with a power train gear 130. The power train gear 130 is associated with a planetary gear train 132 to which it transmits the driving force of the driving motor. As shown in FIG. 15, the planetary gear train 132 has a support shaft 133. A sleeve 134 surrounds the support shaft 133. The sleeve 134 is rotatably about the support shaft 133. An input gear 135 of the planetary gear train 132 is fixed to the lower end of the sleeve 134. The input gear 135 engages the power train gear 130 so as to be driven by the driving force transmitted by the power train gear. A driving gear 136 of substantially smaller diameter than the input gear 135 is fixed to the intermediate portion of the sleeve 134 for rotation therewith. An output gear 137 in the form of a sun gear is rotatably supported at the top of the sleeve 134. The output gear 137 is designed to rotate freely relative to the sleeve 134 and to receive rotational force from the driving gear 136 by means of one or more planetary gears 142.

The output gear 137 generally has the shape of an upside-down dish made up of an upper horizontal wall and vertical cylindrical walls. The vertical cylindrical walls have inside gear teeth 138 engaging the planetary gears 142. The output gear 137 is integral with a smaller diameter gear 139. The planetary gears 142 are supported by pins 141 which extend upward from the upper surface of another output gear 140. The output gear 140 has the same diameter as the input gear 135. In the shown embodiment, two planetary gears 142 are employed. The planetary gears 142 are supported by the output gear 140 at diametrically opposed position.

A reduction gear 144 is supported by a support shaft 143 which extends upwards from the strip 62 of the mechanical chassis 44. The reduction gear 144 has an integral cylindrical sleeve 144a and gear sections 144b. The sleeve section 144a surrounds the support shaft 143 and is free to rotate thereabout. On the other hand, the gear section 144b has a substantially greater diameter than smaller-diameter gear 139 integrally formed with the output gear 137. The reduction gear 144 also has a smaller-diameter gear section 144c at the lower end of the sleeve section 144a. The smaller-diameter gear section 144c lies below the major part of the mechanical chassis 44.

The gear section 144b engages the smaller-diameter gear 139 and so is driven to rotate by the driving force transmitted through the planetary gear train 132. The gear section 144c, of course, rotates at the same speed as the gear section 144b.

A gear 145 mounted beneath the mechanical chassis 44 engages the gear section 144c of the reduction gear 144. The gear 145, in turn, engages the wire driver gear 55 described above.

The driving mechanism also includes reduction gears 146, 147 and 148. The reduction gears 146, 147 and 148 have integral smaller-diameter gear sections 146a, 147a and 148a respectively. The reduction gear 146 engages the output gear 140 of the planetary gear train 132. The smaller-diameter gear 146a of the reduction gear 146 engages the reduction gear 147. The smaller-diameter section 147a of the reduction gear 147 engages the reduction gear 148. The smaller-diameter section 148a of the reduction gear 148 engages the rack teeth 124 of the rack plate 121.

When the motor 128 is running, the revolution of the motor is transmitted to the planetary gear train 132 through the drive shaft 128a, the pulley 129, the belt 131 and the power train gear 130. As described above, the driving force is transmitted from the power train gear 130 to the planetary gear train 132 through the input gear 135. This force drives the input gear 135 to rotate with the sleeve 134 and the drive gear 136. This driving force is transmitted to either the output gear 137 or the output gear 140 selectively. When the output gear 140 is prevented from rotating, the output gear 137 is driven by the driving force transmitted from the drive gear 136 through the planetary gears 142. On the other hand, when the output gear 137 is prevented from rotating, the output gear 140 is driven.

Specifically, when the output gear 140 is prevented from rotating, the pins 141 supporting the planetary gears 142 are held in place. Therefore, the planetary gears 142 are driven through the drive gear 136 without actually turning. Since the planetary gears 142 are synchronously driven via the drive gear, they can drive the output gear 137. The rotation of the output gear 137 is transmitted to the wire driver gear through the smaller-diameter gear 139, the reduction gear 144 and the gear 145.

On the other hand, when the output gear 137 is prevented from rotating, the planetary gears 142 driven to rotate by the drive gear 136 receive a counterdriving force from the output gear 137 which causes them to turn. Since the planetary gears 142 are supported by the pins 141 extending from the output gear 140, the output gear 140 is thus driven to rotate via the drive gear 136 and the planetary gears 142. Rotation of the output gear 140 is transmitted to the rack teeth 124 of the rack plate 121 through the reduction gears 146, 147 and 148.

The driving motor 128 employed in the shown embodiment is a reversible motor which can be driven in either a forward or a reverse direction. In FIG. 7, when the driving motor is driven forward, the planetary gears 142 are driven clockwise, and when the motor is driven in reverse, the planetary gears 142 are driven counterclockwise. The driving motor 128 is driven forward during cassette loading and in reverse durin cassette ejection.

In response to clockwise rotation of the planetary gear 142 due to forward rotation of the driving motor 128, the output gear 137, when free to rotate rotates clockwise, thus driving the reduction gear 144 counterclockwise. The gear 145 is thus driven clockwise and in turn drives the wire driver gear 55 counterclockwise. This causes backward movement of the sliding frame 65. When the output gear 140 is allowed to rotate and the planetary gears 142 are driven clockwise, the output gear 140 rotates counterclockwise. This causes clockwise rotation of the reduction gear 146 together with the smaller-diameter gear 146a, which means the reduction gear 147 rotates counterclockwise at a reduced speed. The counterclockwise rotation of the smaller-diameter gear 147a of the reduction gear 147 causes clockwise rotation of the reduction gear 148 at a also reduced speed. This drives the rack plate 121 forward.

Therefore, as will be appreciated, by driving the motor 128 forward, the sliding frame 65 is driven to the drawn-in position and the rack plate 121 is shifted frontward, causing downward movement of the cassette holder 83 to the downward shifted position, whereupon the cassette loading operation has been completed.

Conversely, by driving the driving motor 128 in reverse, the wire driver gear is driven clockwise, causing the sliding frame 65 to move forward. Similarly, by driving the driving motor in reverse, the reduction gear 148 is driven counterclockwise, causing rearward movement of the rack plate 121 and thus upward movement of the cassette holder 83 to the upward shifted position.

CONTROL MEANS

(FIGS. 7, 8 to 12 and 14)

The sliding frame 65 has a locking plate 149. The locking plate 149 is fixedly secured to the inner surface of the side wall 67 near the rear end of the sliding frame. The locking plate 149 has a lateral locking strip 149a which extends inward from the lower edge of the front end of the locking plate 149. The locking strip 149a opposes the longitudinal center of the rack plate 121 when in the rearward shifted position. The free, forward corner of the locking strip 149a is bevelled at an angle of at about 45°. With this construction, the locking strip 149a cooperates with a locking pin 159 of a locking lever 157 which will be described later.

The sliding frame 65 is also provided with a cam plate 150. The cam plate 150 is fixedly attached to the rear half of the lower edge of the side wall 67. Near its longitudinal center, the cam plate 150 has a cam section 151 extending laterally inward from the inner edge of its major section. Both the front and rear edges 151a and 151b of the cam section 151 are tapered toward the inner edge. The cam section 151 does not extended as far inward as the locking strip 149a.

A locking lever 152, best seen in FIG. 11, serves to restrict longitudinal movement of the rack plate 121. The major section 152a of the locking lever 152 is generally triangular in plan view. An extension 152b extends frontward from the front end of the major section 152a. The locking lever 152 has a hole 153 at the juncture between the major section 152a and the extension 152b. Pins 154 and 155 extend upwards from opposite rear corners of the major section 152a.

The hole 153 in the locking lever 152 receives the guide pin 127 which supports the front end of the rack plate 121 and slidingly engages the elongated hole 122 in the rack plate. The pin 154 of the locking lever 152 slidingly engages the elongated hole 123 in the rack plate 121. The extension 152b has an aperture which receives one end of a bias spring 156. The other end of the bias spring 156 engages the opening 64 through the mechanical chassis 44. Thus, the bias spring 156 exerts a spring force on the locking lever causing pivotal movement of the locking lever 152 about the guide pin 127. The locking recess 123a of the elongated hole 123 is designed to oppose the pin 154 when the rack plate 121 is in the aforementioned rearward shifted position. At this position, the locking lever 152 can be pivotally moved by the bias spring 156 to insert the pin 154 into the locking recess 123a. As a result, locking engagement between the pin 154 and the locking recess 123a is established to prevent the rack plate 121 from moving longitudinally. The locking engagement between the pin 154 and the locking recess 123a is maintained until the locking lever is pivoted against the spring force of the bias spring 156.

Under these conditions, the pin 155 is located to the rear of the cam section 151 of the cam plate 150. During rearward movement of the sliding frame 65, the rear edge of the cam section 151 of the cam plate 150 comes into contact with the pin 155 and shifts the latter so as to cause reverse pivotal movement of the locking lever 152. Therefore, as set forth above, the locking engagement between the locking recess 123a and the pin 154 is released to allow forward movement of the rack plate 121.

Another locking lever 157 serves to lock the sliding frame 65. The locking lever 157 is generally flat and longitudinally elongated and lies just outside of the rack plate 121. The rear end of the locking lever 157 has an upright, C-shaped section 157a. A support pin 158 extends upward from the upper surface of the mechanical chassis 44 and supports the locking lever 157. The upper section of the support pin 158 extends through the channel-shaped section 157a and engages the upper horizontal surface of the channel-shaped section. The locking lever 157 supported by the support pin 158 so as to be free to pivot about the axis of the support pin 158.

The front end of the locking lever 157 also has a lock pin 159. The lock pin 159 extends downward from the lower surface of the front end of the locking lever 157. The locking lever 157 also has a contact pin 160 extending downward from the lower surface of the section between its front and rear ends. The contact pin 160 abuts a peripheral face of a cam section 161 of the rack plate 121. The cam section 161 has an oblique front edge 161a. With this construction, the locking lever 157 is actuated to pivot counterclockwise in accordance with frontward movement of the rack plate 121, as viewed in FIG. 7. On the other hand, the locking lever 157 is normally biased to pivot clockwise by a bias spring 163. One end of the bias spring 163 engages a pin 162 extending from the upper surface of the mechanical chassis and the other end engages the vertical portion of the channel-shaped section 157a of the locking lever 157. This spring force assures contact between the contact pin 159 and the cam face of the cam section 161 and thus ensures counterclockwise pivotal movement of the locking lever 157 according to frontward movement of the rack plate 121.

As will be appreciated from FIG. 7, while the rack plate 121 is in the rearward shifted position, the contact pin 159 is in contact with the front end of the cam face 161a. When the rack plate 121 is driven frontward, the cam face 161a moves frontward, causing lateral displacement of the contact pin 159. Accordingly, the locking lever 157 pivots counterclockwise against the spring force of the spring 163.

It should be appreciated that the sliding frame 65 and the cassette holder 83 are driven by the driving mechanism made up by the locking strip 149a, the cam section 151, the locking lever 152 and the locking lever 157, in the manner given below. During loading and ejection of the magnetic tape cassette 20, the sliding frame 65 and the cassette holder 83 are alternatingly locked to prevent moving and released to be free to move. During cassette loading or ejection, one of the sliding frame 65 and the cassette holder 83 will be locked while the other will be free to move.

Specifically, during cassette loading, the sliding frame 65 with the cassette holder 83 is initially in the drawn-out position in order to receive the magnetic tape cassette. At this position, the sliding frame 65 is free to move toward the drawn-in position. At the same time, the cassette holder 83 is locked in the upward shifted position and is prevented from moving downward. When the sliding frame 65 reaches the drawn-in position, it is locked in place and the cassette holder 83 becomes free to move downward to the downward shifted position. At the downward shifted position of the cassette holder 83, the reel hubs of the magnetic tape cassette 20 engage the reel shafts 37 and 38 and thus cassette loading is completed.

Similarly, during ejection, first the cassette holder 83 is shifted from the downward shifted position to the upward shifted position. During this upward movement of the cassette holder 83, the sliding frame 65 is locked in the drawn-in position. After the cassette holder 83 reaches the upward shifted position and is locked in the upward shifted position, the sliding frame 65 becomes free to move from the drawn-in position to the drawn-out position.

In order to perform the aforementioned selective locking operation, the locking lever 152 is actuated by the cam section 151 of the sliding frame 65 at its fully rearward shifted position, i.e. the drawn-in position. Therefore, as long as the sliding frame 65 is somewhere other than the drawn-in position, the locking lever 152 is locked in place by locking engagement between the locking pin 154 and the locking recess 123a of the rack plate 121. This locking engagement, in turn, prevents the rack plate 121 from moving frontward. Locking the rack plate 121 in the rearward shifted position prevents the reduction gear 148 from rotating. Therefore, the output gear 140 is locked in place.

Under these conditions, the output gear 137 is driven by the planetary gear train 132 while the driving motor 128 is running. As discussed before, as the output gear 137 drives the wire driver gear 55, the sliding frame 65 is driven frontward or rearward between the drawn-out and drawn-in positions.

As will be appreciated, the rack plate 121 is locked in the rearward shifted position under these conditions. Therefore, the cassette holder 83 is held in the upward shifted position.

It should be also be appreciated that a detector (not shown) detects when the sliding frame 65 reaches the drawn out position during frontward movement thereof. The detector produces a detector signal which shuts off the power supply to the driving motor 128 so as to stop the latter.

During rearward movement of the sliding frame 65 from the drawn-out position to the drawn-in position, the cam section 151 of the sliding frame comes into contact with the pin 155 of the locking lever 151. Since the tapered edge 151a of the cam section 151 causes pivotal movement of the locking lever 151 against the biasing force of the spring 156, the locking pin 155 is released from the locking recess 123a when the sliding frame 65 reaches the drawn-in position. This permits the rack plate 121 to move frontward when driven by the driving motor 128 through the power train system.

At approximately the same time, the locking strip 149a of the sliding frame 65 opposes the locking pin 159 of the locking lever 157. Since the sliding frame 65 is in the drawn-in position, the wire drive gear 55 is prevented from rotating. Therefore, the output gear 137 will not rotate. Simultaneously, the output gear 140 is released and thus can be driven by the driving force of the driving motor 128.

The driving force of the driving motor 128 transmitted through the planetary gear train 132 drives the rack plate 121 frontward. Frontward movement of the rack plate 121 in turn drives the cassette holder 83 downward to the downward shifted position.

During this frontward movement of the rack plate 121, the cam edge 161a of the cam section 161 pushes the contact pin 160 of the locking lever 157 laterally. Therefore, the locking lever 157 is pivoted counterclockwise. As a result, the locking pin 159 comes into engagement with the front edge of the locking strip 149a. Therefore, locking engagement between the locking pin 159 and the locking strip 149a is established to prevent the sliding frame 65 from moving frontward, as shown in FIG. 9.

At approximately the same time the cassette holder 83 reaches the downward shifted position, the rear ends of the slots 122 come into contact with the guide pins 127. Thus, the rack plate 121 is also prevented from moving frontward. Therefore, at this position, all of the components of the cassette loading mechanism are prevented from moving. On the other hand, a detector (not shown) detects that the cassette holder 83 is in the downward shifted position after cassette loading. The detector then produces a detector signal which cuts off the power supply to the driving motor.

In the cassette ejection operation, the driving motor 128 is driven in reverse. The driving force of the driving motor 128 is transmitted to the planetary gear train 132. At this time, since the sliding frame 65 is locked and thus prevented from moving frontward, the output gear 137 is also locked. Therefore, the driving force is transmitted to the reduction gear 148 through the output gear 140 of the planetary gear train 132, and the reduction gears 146 and 147. At this time, the reduction gear 148 rotates clockwise to drive the rack plate 121 rearward. This causes the slider 116 to move rearward due to the resilient force of the spring 112. Therefore, the cassette holder 83 moves upward toward the upward shifted position.

As shown in FIG. 8, when the rack plate 121 is in the rearward shifted position, the pusher member 126 of the rack plate 121 is positioned in opposition to the inwardly bent rear end 117 of the slider 116 with a given clearance. The cassette holder 83 reaches the upward shifted position before the rack plate 121 reaches the rearward shifted position.

When the rack plate 121 reaches the rearward shifted position, the locking lever 157 becomes free of the lateral biasing force exerted by the cam edge 161a of the cam section 161 of the rack plate 121. Therefore, it returns to its initial position due to the spring force of the spring 163. This pivotal movement of the locking lever 157 releases the locking pin 159 of the locking leer 157 from the locking strip 149a. Thus, the sliding frame 65 is free to move frontward.

Upon reaching the rearward shifted position, the front ends of the guide slots 122 of the rack plate 121 come into contact with the guide pins 127 which prevent the rack plate 121 from moving also rearward. This prevents further rotation of the reduction gear 148 and thus locks the output gear 140. Since the slider frame 65 is free to move and the output gear 140 is locked, the driving force of the driving motor 128 is transmitted to the wire driver gear 55 through the output gear 137 of the planetary gear train 132. Reverse rotation of the driving motor 128 causes clockwise rotation of the wire driver gear 55. Therefore, the sliding frame 65 is driven frontward to the drawn-out position.

According to frontward movement of the sliding frame 65, the locking lever 152 is pivoted to the locking position. Specifically, during frontward movement of the sliding frame 65 from the drawn-in position to the drawn out position, the cam section 151 moves away from the pin 155 of the locking lever 152. Therefore, the locking lever 152 becomes free from the lateral pivoting force exerted by way of the cam section 151. Therefore, the locking lever 152 is returned to the locking position, in which the pin 154 engages the locking recess 123a, by the spring force of the spring 156.

Therefore, the rack plate 121 is locked in the rearward shifted position. The rack plate 121 is held in the rearward shifted position until the sliding frame 65 is shifted backward to the rearward shifted position.

The cassette holder 83 is provided with a pair of cassette holding means 164 at its rear ends. Each of the cassette holding means 164 comprises a generally L-shaped support member 165. The support member 165 is made of a resilient material and has a vertical section extending upward from the rear end of the side wall 85 and 86 of the cassette holder 83, and a horizontal section extending laterally from the top of the aforementioned vertical section.

A pusher member 166 is mounted on the lower surface of the horizontal section of the support member 165. The pusher member 166 is made of a synthetic resin and has an essentially conical downward section and a flat upper surface. A pin 167 protrudes upwards from the center of the upper surface. The pin 167 extends through an opening 168 through the horizontal section of support member 165, as shown in FIGS. 12 and 13. The top of the pin 167 is clamped to fix the pushing member 166 onto the horizontal section of the support member 165.

CASSETTE RECEPTACLE (FIGS. 1, 6, 7, 13, 14)

A holder frame 169 is mounted at the front of the sliding frame 65. The holder frame 169 has a front wall 170. The front wall 170 conforms in size to the cassette receptacle opening 34 in the front panel 33a of the housing 33. When the sliding frame 65 is in the drawn-in position, the front surface of the front wall of the holding frame 169 lies flush with the front surface of the front panel. The front wall 170 has an inclined rear surface which thickens towards its bases. A cut-out 170b is formed at the lateral center of the rear surface 170a of the front wall 170.

The holder frame 169 has side walls 171. The side walls 171 both have cut-outs 171a in their front ends. The holder frame 169 also has a bottom plate 172. The bottom plate 172 extends horizontally from the lower edge of the front wall 170. The rear edge of the bottom plate 172 lies near the longitudinal center of the cut-out recess 171a. The bottom plate 172 has a laterally centered cut-our groove 172a. The cut-out 172a is laterally positioned opposite the cut-out 170b of the front wall 170 and its front end adjoins the lower end of the latter.

The holder frame 169 also has a ceiling plate 173 extending laterally over the rear ends of the side walls 171. The side walls 171 have lateral recesses 174 near their rear ends and immediately in front of the junctures between the ceiling plate 173 and the side walls 171. These recesses 174 are generally rectangular and receive the cassette holding means 165 of the cassette holder 83. The ceiling plate 173 has a cut-out 175 in its rear edge. The cut-out 175 is centered laterally on the ceiling plate and is generally trapezoidal with its wider side along the rear edge.

The bottom plate 172 of the holder frame 169 generally opposes the front plate 69 of the sliding frame 65 but is slightly higher than the latter. The ceiling plate 173 is longitudinally positioned such that its lateral edges overlap the front part of the supporting strip 73 of the sliding frame 65. The holder frame 169 is fixed to the sliding frame 65 by means of fastening screws 176 which engage the threaded holes 72 and 74.

The side walls 171 of the holder frame 170 cover the side walls 85, 86 of the cassette holder 83, the side walls 66, 67 of the sliding frame 65 and the associated lever mechanism described above. Therefore, they cannot be seen from outside even when the sliding frame 65 is in the drawn-out position and thus the cassette holder 83 is in the eject position.

It should be appreciated when the cassette holder 83 is in the upward shifted position, its bottom wall 84 lies flush with the bottom plate 172 of the holder frame 170. In this case, the front edge of the bottom wall 84 of the cassette holder 83 lies longitudinally immediately behind the rear edge of the bottom plate 172 of the holder frame 170.

When the cassette holder 83 is in the upward shifted position, it constitutes a cassette receptacle 177 which receives the magnetic tape cassette 1. The bottom wall 84 of the cassette holder 83 cooperates with the bottom plate 172 and the side walls 171 of the holder frame 170 to define the cassette receptacle 177.

As can easily be appreciated, when the sliding frame 65 is in the drawn-out position, the cassette receptacle 177 protrudes from the front surface of the front panel 33a of the housing. In this cassette receptacle position, the magnetic tape 1 can be inserted and removed. The cut-outs 171a in the side walls 171 of the holder frame 170 allow the user to conveniently grasp the magnetic tape cassette.

The magnetic tape cassette 1 can be inserted in the cassette receptacle 177 by the following steps:

first, the magnetic tape cassette 1 is held at an angle so that its front edge is lower than the rear edge;

at this inclined position, the front end is inserted into the clearance between the ceiling plate 173 and the bottom plate 84 of the cassette holder 83; and thereafter, the rear edge is pushed downward to complete insertion of the magnetic tape cassette into the cassette receptacle.

The position of the cassette in the cassette receptacle resulting from the above series of steps will hereafter be referred to as the "provisionally set position".

When the magnetic tape cassette 1 is in the provisionally set position, the pivotal closure lid 9 and the sliding closure member 11 are still held in their respective closed positions. In this position, the contact pieces 90 of the cassette holder 83 contact the corresponding contact pieces 15 of the sliding closure member 11 through the cut-outs 24 of the pivotal closure lid 9. Also, when the magnetic tape cassette 1 is in the provisionally set position, the apertures 20 of the sliding closure member 11 are in alignment with the corresponding through openings 87. Furthermore, in this position, the cassette holding means 164 elastically depresses the front edge of the magnetic tape cassette 1 downward by way of the pushing members 166.

CASSETTE SETTING MECHANISM

(FIGS. 7, 8, 12 to 14)

A cassette setting mechanism serves to shift the magnetic tape cassette 1 from the provisionally set position to a position wherein the pivotal closure lid 9 and the sliding closure member 11 are both open and the apertures 21 of the cassette casing 2 are in alignment with the apertures 20 and the through openings 87. The cassette setting mechanism generally comprises pusher levers 178 and 179.

The pusher lever 178 is flat, laterally elongated and bent in the middle. The pusher lever 178 has an opening 180 at the bend. The pin 71 projecting upward from the front panel 69 of the sliding frame 65 passes through the opening 180 and pivotably supports the latter. A pushing pin 181 projects upward from one end of the pusher lever 178. An actuation pin 182 extends downward from the other end of the pusher lever 178. The pusher lever 178 also has a rearward strip 183. The strip 183 has a hole which anchors one end of a bias spring 185. The other end of the bias spring 185 engages a pin 184 extending downward from the lower surface of the front panel 69 of the sliding frame 65.

It should be appreciated that the pusher lever 178 is disposed within a clearance between the front panel 69 of the sliding frame 65 and the lower end of the front wall 170 of the holder frame 169. The pushing pin 181 protrudes through the groove 172a in the bottom plate of the holder frame 169 and reaches into the recess 171b in the front wall 171 when pivoted frontward. The actuation pin 182 opposes the vertical section 42b of the contact strip 42 of the mechanical chassis.

In the normal position, the pusher lever 178 is biased by means of the bias spring 185 so that the pushing pin 180 lies within the recess 170b of the front wall 170 of the holder frame 169, as shown in FIG. 7. The actuation pin 182 comes into contact with the vertical section 42b of the contact strip 42 of the mechanical chassis 44 while the sliding frame 65 is driven from the drawn-out position to the drawn-in position. This causes the pusher lever 178 to pivot clockwise about the pin 71 as viewed in FIG. 7 against the spring force of the bias spring 185. Therefore, the pushing pin 180 is shifted rearward along the groove 172a of the bottom plate 172 of the holder frame 169. During this rearward shift, the pushing pin 180 pushes the magnetic tape cassette 1 rearward.

During this rearward movement of the magnetic tape cassette 1, the front end 91a enters the groove 22, comes into contact with the locking head 29 and so pushes the latter upward, as shown in FIG. 17(A). Therefore, the sliding closure member 11 is released and thus is free to move rearward in response to the force exerted through the contact pieces 15 and 90. The sliding closure member 11 is thus shifted from the closed position to the open position. As a result, the pivotal closure member 9 becomes free to pivot. Therefore, the pivotal closure lid 9 can move from the closed position to the open position.

When the magnetic tape cassette 1 within the holder frame 169 reaches the rearward limit of travel, the rear end of the cassette casing 2 lies slightly rearward of the front edge of the cross-member 75 of the sliding frame 65. At this position, the pushing members 166 of the cassette holding means 164 contact the upper surface of the upper section 3 of the cassette casing 1 at points rearward of the front edge of the cassette. Specifically, the pushing members 166 exert a downward force on the center of the magnetic tape cassette 1. This holds the magnetic tape cassette 1 securely in the set position.

The pusher lever 179 is generally flat and laterally elongated. The pusher lever 179 has a through opening 187 at its center. Also, the pusher lever 179 has a longitudinal strip 188 which extends rearward from the rear edge of the lateral section. A pusher pin 189 extends downward from the lower surface of the inner end of the pusher lever 179. The pusher lever 179 is pivotally supported by means of a pivot pin 190 which extends from the cross-member 75 of the sliding frame 65. The pusher lever 179 is biased counterclockwise as viewed in FIG. 7 by a bias spring 192 which is anchored between the strip 188 and a lateral strip 191 extending inward from the guide block 77.

As will be appreciated from FIG. 7, the pivot pin 190 is laterally offset from the longitudinal center so that its inner end carrying the pusher pin 189 lies near the center. The outer end of the pusher lever 179 opposes the rear face of the vertical section 49a of the bracket 49. While the sliding frame 65 is in the drawn-in position, the outer end of the pusher lever 179 supported by the cross-member 75 is in the rearward shifted position. Therefore, the pusher lever 179 is separated from the rear face of the vertical section 49a of the bracket 49, as shown in FIG. 8. At the same time, the counterclockwise biasing force exerted by the bias spring 192 holds the pusher lever 179 angularly offset counterclockwise. At this position, the pusher pin 189 engages the cut-out 76 in the central section of the front edge of the cross-member 75. As a result, the pusher lever 179 extends essentially laterally. This lever position of the pusher lever 179 will hereafter be referred to as a "stand-by" position.

It should be appreciated that, at the stand-by position of the pusher lever 179, the pusher pin 189 lies in front of the front end of the magnetic tape cassette 1.

When the sliding frame 65 moves from the drawn-in position to the drawn-out position, the pusher lever 179 is carried with the cross-member 75. During this frontward movement of the sliding frame 65, the pusher lever 179 is held in at the stand-by position until its outer end comes into contact with the rear face of the vertical section 49a of the bracket 49. Further frontward movement of the sliding frame 65 with the cross-member 75 while holding the outer end of the pusher lever 179 in contact with the vertical section 49a drives the pusher lever 179 clockwise against the bias spring force of the spring 192. This causes the pusher pin 189 to contact the front end of the magnetic tape cassette 1. As a result, the magnetic tape cassette 1 is pushed backwards to the provisionally set position. This backward movement of the magnetic tape cassette within the holder frame 169 due to the force exerted through the pusher lever 179 terminates when the sliding frame 65 reaches the drawn-out position.

During the aforementioned movement from the set position to the provisionally set position, the pivotal closure lid 9 and sliding closure member 11 are returned to their respective closed positions from their open positions.

OPENING AND CLOSING THE SLIDING CLOSURE MEMBER

(FIGS. 1 to 5, 17(A) to 17(D))

As set forth above, during cassette loading and ejection, the sliding closure member 11 of the magnetic tape cassette 1 is automatically moved between the closed and open positions. Specifically, during the cassette loading process, the sliding closure member 11 is moved from the closed position to the open position in order to enable tape loading, recording, reproduction and so forth; and during cassette ejection, the sliding closure member 11 is returned to the closed position. This movement includes locking and unlocking the sliding closure member 11. The sliding closure member 11 is locked at both the closed position and the open position.

The sliding closure member is opened during movement of the magnetic tape cassette 1 from the provisionally set position to the set position within the holder frame 169 by the effect of the pusher lever 178. On the other hand, the sliding closure member is closed during movement of the magnetic tape cassette 1 from the set position to the provisionally set position within the holder frame 169 by the effect of the pusher lever 179. The sliding closure opening and closing operations will be described herebelow, generally with reference to FIGS. 17(A) to 17(D).

In the cassette loading operation, first the magnetic tape cassette 1 is placed on the cassette receptacle 177 defined within the holder frame 169, as set forth above. Then, the magnetic tape cassette 1 is moved to the provisionally set position. At this position, the cut-out 23 of the pivotal closure lid 9 is positioned in front of the longitudinal projection 91 of the bottom plate 84 of the cassette holder 83, which constitutes the bottom of the cassette receptacle 177. At the same time, the locking head 29 of the locking lever 27 maintains locking engagement with the circular hole 26 of the sliding closure member 11 and thus holds the sliding closure member locked in the closed position.

Under these conditions, the sliding frame 65 is driven backwardly from the drawn-out position to the drawn-in position, carrying with it the cassette holder 83 and the holder frame 169. This backward movement of the sliding frame 65 actuates the pusher lever 178 which pushes the magnetic tape cassette 1 from the provisionally set position to the set position.

Initial movement of the magnetic tape cassette 1 through a certain distance causes the projection 91 of the bottom plate 84 of the cassette holder 83 to protrude into the groove 22 of the sliding closure member 11 through the cut-out 23 of the pivotal closure lid 9. The tapered front end 91a of the projection 91 then opposes the locking head 29 of the locking lever 27 projecting into the groove 22 through the circular hole 26 of the sliding closure member 11. Further movement of the magnetic tape cassette toward the set position brings the tapered front end 91a of the projection 91 into contact with the lower end of the locking head 29. Therefore, the locking head 29 is pushed upwardly until its lower end lies flush with the lower surface of the sliding closure member. At the same time, the claws 90 of the strips 89 come into contact with the contact pieces 15 through the cut-outs 24 of the pivotal closure member 9. The claws 90 exert a rearward force on the sliding closure member 11 through the contact pieces 15 according to the movement of the magnetic tape cassette. Since the walls of the circular hole 26 are tapered as shown in FIG. 17(A), the locking head 29 of the locking lever 27 raised also until its lower end rests on the upper surface of the sliding closure member, as shown in FIG. 17(B). Thus, the sliding closure member 11 is released from the closed position by the movement of the magnetic tape cassette from the provisionally set position to the set position.

In this released state, the sliding closure member 11 is moved to the open position by the rearward force exerted on the contact pieces 15 thereof through the claws 90.

At the open position, the locking head 29 engages the cut-out 25 of the sliding closure member 11. This locks the sliding closure member 11 in the open position.

At this position, the apertures 20 are aligned with the apertures 21 of the lower section 4 of the cassette casing 2 which are, in turn, aligned with the through openings 87 of the cassette holder.

At the same time, this movement of the sliding closure member 11 to the open position releases the restriction on pivotal movement of the pivotal closure lid 9. Therefore, the pivotal closure lid 9 may pivot from the closed position to the open position. Actuation of the pivotal closure lid 9 from the closed position to the open position is performed in a per se well-known manner during movement of the magnetic tape cassette from the provisionally set position to the set position.

In the cassette ejection operation, the pusher lever 179 is actuated according to frontward movement of the sliding frame 65 from the drawn-in position to the drawn-out position. This causes movement of the magnetic tape cassette 1 from the set position to the provisionally set position, as set forth above. At the initial stage of magnetic tape cassette movement toward the provisionally set position, the tapered rear end 91b of the projection 91 comes into contact with the lower end of the locking head 29 of the locking lever 27. Further movement of the magnetic tape cassette 1 toward the provisionally set position raises the locking head 29 into alignment with the lower surface of the sliding closure member 11. Since the sliding closure member 11 is biased frontwardly toward the closed position by means of the torsion spring 18, and since the walls of the cut-out 25 are tapered as shown in FIG. 17(C), the locking head 29 is raised also until the sliding closure member 11 is free to move from the open position to the closed position. At the same time, the claws 90 moved frontward with the cassette holder 83. Therefore, the sliding closure member 11 becomes free of the claws 90. Thus, the sliding closure member 11 moves from the open position to the closed position due to the biasing force exerted by the torsion spring 18. At the closed position of the sliding closure member 11, the locking head 29 again engages the circular hole 26 of the sliding closure member to prevent the sliding closure member from accidentally moving to the open position.

During the aforementioned movement of the sliding closure movement from the set position to the provisionally set position, the pivotal closure lid 9 is actuated from the open position to the closed position by a per se well-known mechanism. When the sliding closure member 11 is in the closed position, the upper edges of the sliding closure member 11 abut the side arms of the pivotal closure lid and so prevent the pivotal closure lid from pivoting. Therefore, the pivotal closure lid 9 is also locked in the closed position.

CASSETTE LOADING AND EJECTION OPERATIONS

An eject button (not shown) mounted on the front panel 33a of the housing 33 is depressed to eject the magnetic tape cassette from the above-described preferred embodiment of the recording and/or reproducing apparatus according to the invention, or to prepare the cassette receptacle for loading. In response to depression of the eject button, the driving motor 128 starts driving in a reverse direction. As set forth above, when the driving motor 128 runs in reverse, first, it raises the cassette holder from the downward shifted position to the upward shifted position. After the cassette holder 83 is locked in the upward shifted position, the sliding frame 65 is driven frontward along with the cassette holder 83 and the holder frame 169. Thus, the sliding frame 65 is shifted to the drawn-out position. At this time, driving force is transmitted to the sliding frame driving wire 81 through the planetary gear train 132. In the drawn-out position of the sliding frame 65, the cassette receptacle 177 defined by the holder frame 169 and the cassette holder 83 is exposed to the outside of the housing 33 for receiving the magnetic tape cassette 1.

At this position, the magnetic tape cassette 1 is placed into the cassette receptacle 177. In order to initiate cassette loading, the presence of the magnetic tape cassette 1 may be detected by means of an appropriate sensor (not shown). Alternatively, the recording and/or reproducing apparatus may have a "load button" (not shown) on the housing 33 to initiate loading.

When the driving motor 128 runs forward, the sliding frame 65 is driven rearward by the driving mechanism described above to the drawn-in position. During this rearward movement of the sliding frame 65, the pusher lever 178 is actuated to push the magnetic tape cassette 1 into the cassette receptacle 177 to the set position. The sliding closure member 11 and the pivotal closure lid 9 are then actuated from the closed position to the open position. When the sliding frame 65 reaches the drawn-in position, power transmission for the driving motor 128 is switched so as to drive the cassette holder 83. Therefore, the cassette holder 83 carrying the magnetic tape cassette 1 is driven downward to the downward shifted position to complete the cassette loading operation.

After completing the cassette loading operation, tape loading operation is initiated. The mechanisms and operation of tape loading system are commonly known for rotary-head-type recorders. One example of such a tape loading system has been disclosed in the co-pending U.S. patent application Ser. No. 739,287, filed on May 30, 1985, by Tsuyoshi Nagasawa et al and assigned to assignee of the present invention. The corresponding tape loading system has been disclosed in the European Patent First Publication No. 0163527, published on Dec. 4, 1985.

For unloading the magnetic tape 1, the aforementioned eject button is depressed to start the driving motor 128 running in reverse. As described above, the cassette holder 83 is then driven to the upwardly shifted position and the sliding frame 65 is driven to the drawn-out position. At the same time, the pusher lever 179 is actuated to push the magnetic tape cassette 1 from the set position to the provisionally set position. Therefore, at the drawn-out position of the sliding frame 65, the magnetic tape cassette 1 can be removed from the receptacle 177.

ANOTHER EMBODIMENT

(FIG. 18)

Figure 18:
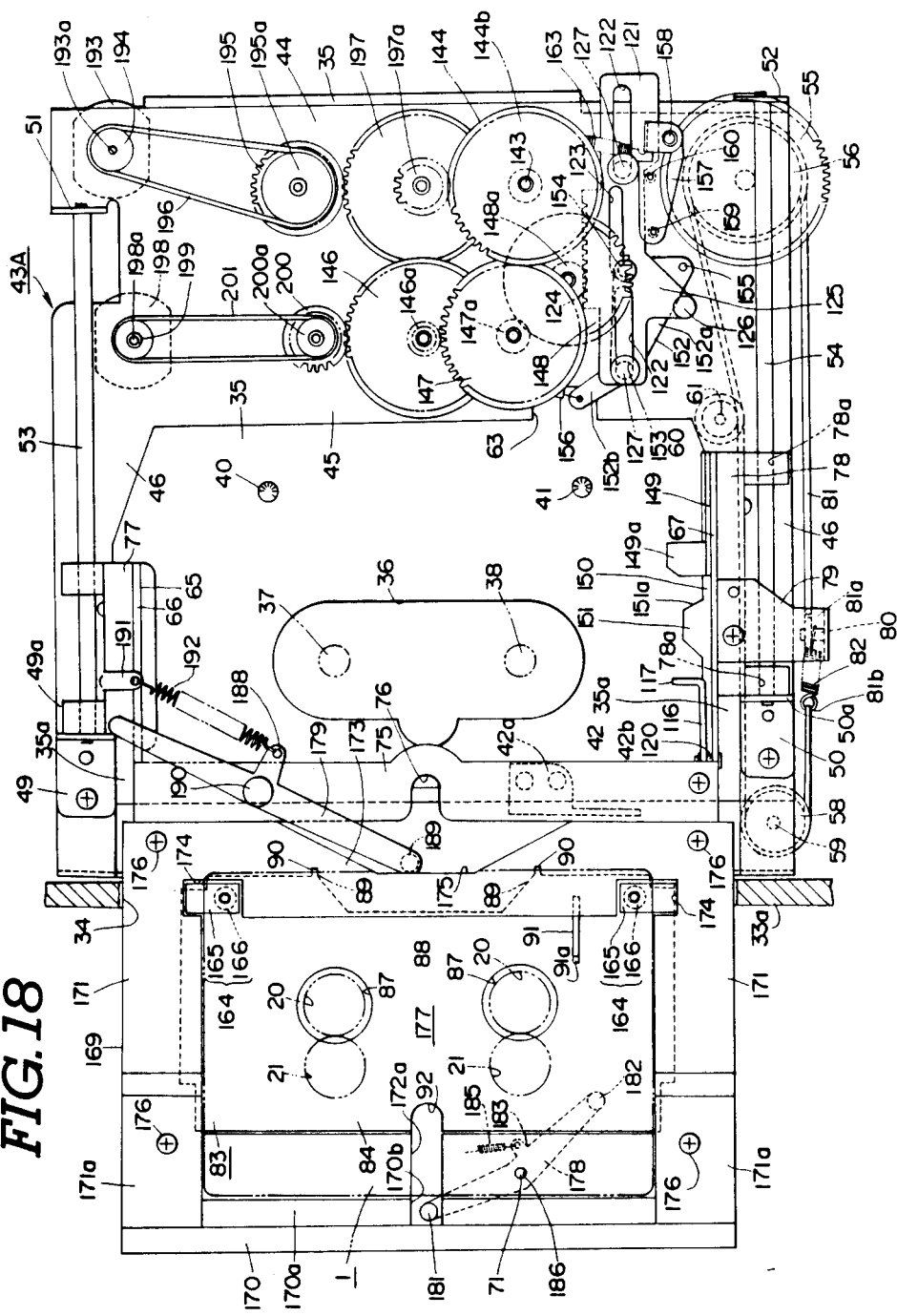
FIG. 18 is a plan view of the recording and/or reproducing apparatus of the present invention, which includes the second embodiment of a magnetic tape cassette loading system.

FIG. 18 shows another embodiment of the recording and/or reproducing apparatus for a magnetic tape cassette according to the present invention. The shown alternative embodiment differs from the preferred embodiment of the recording and/or reproducing apparatus with regard to the driving mechanism for driving the sliding frame between the drawn-out position and the drawn-in position, and driving the cassette holder between the upward shifted position and downward shifted position. The driving mechanism according to this embodiment will be generally represented by the reference numeral 43A.

The driving mechanism 43A employs mutually independently operable motors 193 and 198. The motor 193 is intended to drive the sliding frame 65 between the drawn-out position and the drawn-in position. A drive pulley 194 is fixedly mounted on the output shaft 193a of the motor 193. The drive pulley is connected to a driven pulley section 195a of a power train gear 195 via an endless belt 196. The power train gear 195 engages a reduction gear 197. The reduction gear 197 has an integral smaller-diameter gear 197a. The smaller-diameter gear 197a engages the reduction gear 144 which is identical to that of the former embodiment. Specifically, the reduction gear 144 has a cylindrical sleeve extending downward and a gear section at the lower end of the sleeve. The gear section engages the intermediate gear represented by the reference numeral 145 in the previous embodiment. The reduction gear 144 is connected to the driving gear 55 associated with the wire drive pulley 56 via the intermediate gear.

It should be appreciated that, as in the previous embodiment, the motor 193 is driven in reverse to drive the sliding frame 65 from the drawn-in position to the drawn-out position. On the other hand, the motor 193 is driven forward when driving the sliding frame 65 from the drawn-out position to the drawn-in position.

The motor 198 is intended to drive the cassette holder 83 between the upward shifted position and the downward shifted position by driving the rack plate 121 longitudinally between the frontward shifted position and the rearward shifted position.

The motor 198 has an output shaft 198a. A drive pulley 199 is fixed to the output shaft 198a. The drive pulley 199 cooperates with a pulley section 200a of a power train gear 200 through an endless belt 201. The power train gear 200 is directly connected to the first reduction gear 146. As explained with respect to the previous embodiment, the reductions gears 146, 147 and 148 constitute a reduction gear train which transmits the force of the driving motor 198 to the rack plate 121 to drive the latter longitudinally.

As in the previous embodiment, the motor 198 is driven in reverse to drive the rack plate 121 to the rearward shifted position and, thus to drive the cassette holder 83 from the downward shifted position to the upward shifted position. On the other hand, the motor 198 is driven forward to drive the rack plate 121 from the rearward shifted position to the frontward shifted position and, thus, to drive the cassette holder 83 from the upward shifted position to the downward shifted position.

In order to control drive timing of the motors 198 and 198, sensors detect when the sliding frame 65 is in the drawn-out and drawn-in positions and when the cassette holder 83 is in the upward shifted and downward shifted positions. When loading a cassette, first the motor 193 drives the sliding frame 65 from the drawn-out position to the drawn-in position. A sensor detects when the sliding frame 65 reaches the drawn-in position, whereupon the motor 193 stops running and the motor 198 starts to run. The motor 198 then drives the rack plate 121 frontward to the frontward shifted position so that the cassette holder 83 is shifted downward to the downward shifted position. When the cassette holder 83 reaches the downward shifted position, a sensor detects the presence of the cassette holder 83 and turns off the motor 198. Thus, the cassette loading process has been completed.

When ejecting a cassette, first the motor 198 drives the cassette holder 83 from the downward shifted position to the upward shifted position. A sensor detects when the cassette holder 83 reaches the upward shifted position. Then, the motor 198 stops running. Once the cassette holder 83 reaches the upward shifted position, the motor 193 starts driving forward to drive the sliding frame 65 from the drawn-in position to the drawn-out position. At the drawn-out position of the sliding frame 65, the motor 193 stops running in response to detection of the presence of the sliding frame by a sensor.

As will be clear from the detailed description given hereabove, the recording and/or reproducing apparatus according to the present invention facilitates automatic cassette loading and ejection to the extent that it is necessary only to put the magnetic tape cassette onto or into a cassette receptacle. The cassette loading and ejection operations includes automatic actuation of the sliding closure member and the pivotal closure lid of the magnetic tape between the closed position and the open position during cassette loading and ejection.

In addition, according to the present invention, since the recording and/or reproducing apparatus loads a cassette while preventing the cassette holder from simultaneously moving both horizontally and vertically, faulty operation of sensors or other components of the cassette loading mechanism will never result in serious damage to the overall mechanism.

While the present invention has been disclosed in detail in terms of the specific embodiments, the invention can be implemented in various ways. Various embodiments and modifications of the shown embodiments can be used to implement the present invention. Therefore, the present invention should be appreciated to include all possible embodiments and modifications which can be embodied without department from the principles of the invention which will be described in the appended claims.

What is claimed is:

1. A cassette loading system in a recording and/or reproducing apparatus for a magnetic tape cassette which has at least a sliding closure member openably closing a cut-out in a bottom surface of the cassette casing, which cassette loading system comprises:

cassette holding means for receiving and holding said magnetic tape cassette within a cassette receptacle defined therein, said cassette holding means being movable between an eject position, in which said cassette holding means can receive a cassette and allow a cassette to be removed, and a loading position at which cassette loading is completed; and first means, associated with said cassette holding means, for moving said sliding closure member from a closed position to an open position in synchronism with movement of said cassette holding means from said eject position to said loading position.

2. A cassette loading system as set forth in claim 1, wherein said first means comprises a first pusher means for shifting said magnetic tape cassette in said cassette receptacle from a first position, at which said magnetic tape cassette can be removed from said cassette receptacle, to a second position, at which said magnetic tape cassette is held within said cassette receptacle, said pusher means being associated with said cassette holding means for synchronous operation therewith and moving said sliding closure member from said closed position to said open position during shifting of said magnetic tape cassette from said first position to said second position.

3. A cassette loading system as set forth in claim 2, wherein said magnetic tape cassette includes first locking means for locking said sliding closure member in said closed position, and said first means also comprises a first unlocking means active during operation of said pusher means for unlocking said first locking means of said magnetic tape cassette thereby enabling said sliding closure member to be moved from said closed position to said open position.

4. A cassette loading system as set forth in claim 3, which also comprises second means, associated with said cassette holding means, for moving said sliding closure member from said open position to said closed position in synchronism with movement of said cassette holding means from said loading position to said eject position.

5. A cassette loading system as set forth in claim 4, wherein said second means comprises a second pusher means for shifting said magnetic tape cassette in said cassette receptable from said second position to said first position, said second pusher means being associated the said cassette holding means for synchronous operation therewith and moving said sliding closure member from said open position to said closed position during shifting of said magnetic tape cassette from said second position to said first position.

6. A cassette loading system as set forth in claim 5, wherein said magnetic tape cassette includes second locking means for locking said sliding closure member in said open position, and said second means also comprises a second unlocking means active during operation of said second pusher means for unlocking said second locking means of said magnetic tape cassette, thereby enabling said sliding closure member to be moved from said open position to said closed position.

7. A cassette loading system as set forth in claim 2, wherein said cassette holding means comprises an elastic means for elastically holding said magnetic tape cassette in said second position.

8. A cassette loading system as set forth in claim 1, which also comprises second means, associated with said cassette holding means, for moving said sliding closure member from said open position to said closed position in synchronism with movement of said cassette holding means from said loading position to said eject position.

9. A cassette loading system as set forth in claim 8, wherein said second means comprises a second pusher means for shifting said magnetic tape cassette in said cassette receptacle from said second position to said first position, said second pusher means being associated with said cassette holding means for synchronous operation therewith and moving said sliding closure member from said open position to said closed position during shifting of said magnetic tape cassette from said second position to said first position.

10. A cassette loading system as set forth in claim 9, wherein said magnetic tape cassette includes second locking means for locking said sliding closure member in said open position, and said second means also comprises a second unlocking means active during operation of said second pusher means for unlocking said second locking means of said magnetic tape cassette, thereby enabling said sliding closure member to be moving from said open position to said closed position.

11. A cassette loading system as set forth in claim 8, wherein said cassette holding means comprises a horizontally movable component and a vertically movable component, said vertically movable component holding said magnetic tape cassette, said horizontally movable component being movable between said eject position and an intermediate position located at an intersection between the horizontal movement of said horizontally movable component and the vertical movement of said vertically movable component, said vertically movable component being movable between said intermediate position and said loading position and cooperative with said horizontally movable component for horizontal movement therewith.

12. A cassette loading system as set forth in claim 11, which also comprises first locking means for locking said vertically movable component at said intermediate position for restricting vertical movement thereof during horizontal movement with said horizontally movable component.

13. A cassette loading system as set forth in claim 12, which also comprises a second locking means for locking said horizontally movable component at said intermediate position for restricting horizontal movement thereof, during vertical movement of said vertically movable component.

14. A cassette loading system as set forth in claim 13, which also comprises a pair of arms, one end of which is associated with said vertically movable member and the other end of which is associated with said horizontally movable component, said arms being connected by means of a pivot for pivotal movement between a first position in which said vertically movable component is vertically offset from said horizontally movable component, and a second position in which said vertically movable component is in said intermediate position.

15. A cassette loading system as set forth in claim 14, wherein said arms are associated with said first locking means to be locked in said second position.

16. A cassette loading system for a recording and/or reproducing apparatus for a magnetic tape cassette which has a sliding closure member openably closing a cut-out in a bottom surface of the cassette casing, the cassette loading system comprising:

cassette holding means for receiving and holding said magnetic tape cassette within a cassette receptacle defined therein, said cassette holding means being movable among a first position in which said cassette receptacle is exposed for insertion and removal of said magnetic tape cassette, a second position horizontally offset from said first position, and a third position vertically offset from said second position and at which cassette loading is completed;

first means, associated with said cassette holding means, for driving the latter between said first and second positions;

second means, associated with said cassette holding means, for driving the latter between said second and third positions;

timing control means, associated with said first and second means, for selectively enabling and disabling functioning of said first and second means during movement of said cassette holding means, said timing control means disabling one of said first and second means while the other of said first and second means is in operation; and third means, associated with said cassette holding means, for moving said sliding closure member between said closed position and said open position during movement of said cassette holding means between said first and second positions.

17. A cassette loading system as set forth in claim 16, wherein movement of said cassette holding means includes a horizontal component and a vertical component, said horizontal and vertical components intersecting at a third position, and said third means is active during horizontal movement of said cassette holding means between said first and third positions.

18. A cassette loading system as set forth in claim 17, wherein said third means is adapted to drive said magnetic tape cassette between a set position at which said magnetic tape cassette is held within said cassette holding means, and a released position wherein said magnetic tape cassette rests freely within said cassette holding means, said third means actuating said sliding closure lid between said closed position and said open position during movement of said magnetic tape cassette between said set position and said released position.

19. A cassette loading system as set forth in claim 18, wherein said magnetic tape cassette includes a locking means for locking said sliding closure member in said closed positions, and said third means unlocks said locking means of said magnetic tape cassette while actuating said sliding closure member from said closed position to said open position.

20. A cassette loading system for a recording and/or reproducing apparatus for a magnetic tape cassette which has a sliding closure member openably closing a cut-out in a bottom surface of the cassette casing, the cassette loading system comprising:

cassette holding means for receiving and holding said magnetic tape cassette within a cassette receptacle defined therein, said cassette holding means being movable among a first position in which said cassette receptacle is exposed to facilitate insertion and removal of said magnetic tape cassette, a second position horizontally offset from said first position, and a third position vertically offset from said second position and at which cassette loading is completed;

first means, associated with said cassette holding means, for driving the latter between said first and second positions;

second means, associated with said cassette holding means, for driving the latter between said second position and third position;

third means, associated with said first means, for selectively moving said sliding closure member between closed positions and open positions depending upon the cassette holder position between said first and second positions; and timing control means, associated with said first and second means, for selectively enabling and disabling operation of said first and second means during movement of said cassette holding means, said timing control means disabling one of said first and second means while the other of said first and second means is in operation.

21. A cassette loading system as set forth in claim 20, wherein said cassette holding means is movable in a first horizontal direction and in a second vertical direction, and prevented from moving in said second direction during movement in said first direction and from moving in said first direction during movement in said second direction.

22. A cassette loding means as set forth in claim 21, wherein said third means is active for moving said sliding closure member between said closed position and said open position during the movement of said cassette holding means in said first direction.

23. A cassette loading means as set forth in claim 20, wherein said third means is active for moving said sliding closure member between said closed position and said open position during the movement of said cassette holding means in a horizontal direction.

24. A combination of a magnetic tape cassette and a cassette loading system in a recording and/or reproducing apparatus for said magnetic tape cassette wherein:

said magnetic tape cassette includes:
a cassette casing housing a magnetic tape and having a front opening exposing said magnetic tape therethrough, and a cut-out in a floor of said cassette casing for receiving a tape loading mechanism of a recording and/or reproducing apparatus therethrough;

a pivotal closure lid for openably closing said front opening of said magnetic tape cassette;

a sliding closure member movable between a closed position closing said cut-out and an open position opening said cut-out; and locking means, associated with said sliding closure member, for locking the latter in said closed position and in said open position; and wherein said loading system comprises:
cassette holding means for receiving and holding said magnetic tape cassette within a cassette receptacle defined therein, said cassette holding means being movable among a first position in which said cassette receptacle is exposed to facilitate insertion and removal of said magnetic tape cassette, a second position horizontally offset from said first position, and a third position vertically offset from said second position and at which cassette loading is completed;

first means, associated with said cassette holding means, for driving the latter between said first and second positions;

second means, associated with said cassette holding means, for driving the latter between said second position and third position;

third means, associated with said first means, for selectively actuating said pivotal closure lid and said sliding closure member between closed positions and open positions depending upon cassette holder position between said first and second positions; and a timing control means for selectively enabling and disabling operation of said first and second means during movement of said cassette holding means, said timing control means disabling one of said first and second means while the other of said first and second means is in operation.

25. A cassette loading system in a recording and/or reproducing apparatus for a magnetic tape cassette which has a cassette casing housing therein a magnetic tape, said cassette casing being formed with a front end opening and a bottom opening to expose said magnetic tape therethrough, a pivotal lid being associated with said front end opening for selectively opening said front end opening for allowing access to said magnetic tape and closing for blocking access to said magnetic tape, and a sliding shutter associated with said bottom opening for selectively opening said bottom opening for allowing access to said magnetic tape therethrough and closing for blocking access to said magnetic tape, comprising:

cassette holding means for receiving and holding said magnetic tape cassette within a cassette receptacle defined therein, said cassette holding means being movable between an eject position, in which said cassette holding means can receive said cassette and allow a cassette to be removed, and a loading position at which cassette loading is completed along a predetermined path which includes a first component directed in a first direction and a second component directed in a second direction perpendicular to said first direction; and first means, associated with said cassette holding means, for actuating said pivotal lid and said sliding closure member to an open position in synchronism with movement of said cassette holding means from said eject position to said loading position.

* * * * *